US009026538B2

(12) United States Patent
Promhouse et al.

(10) Patent No.: US 9,026,538 B2
(45) Date of Patent: May 5, 2015

(54) METHOD FOR PERFORMING TRANSACTIONS ON DATA AND A TRANSACTIONAL DATABASE

(75) Inventors: Gary J. Promhouse, Kitchener (CA); Matthew David George Timmermans, Ottawa (CA); Karl-Heinz Krachenfels, Taufkirchen (DE)

(73) Assignee: Open Text S.A., Luxembourg (LU)

( * ) Notice: Subject to any disclaimer, the term of this patent is extended or adjusted under 35 U.S.C. 154(b) by 404 days.

(21) Appl. No.: 13/501,690

(22) PCT Filed: Oct. 13, 2009

(86) PCT No.: PCT/EP2009/063331
§ 371 (c)(1),
(2), (4) Date: Sep. 11, 2012

(87) PCT Pub. No.: WO2011/044929
PCT Pub. Date: Apr. 21, 2011

(65) Prior Publication Data
US 2013/0110766 A1 May 2, 2013

(51) Int. Cl.
*G06F 17/30* (2006.01)
*G06F 9/46* (2006.01)

(52) U.S. Cl.
CPC .......... *G06F 9/466* (2013.01); *G06F 17/30377* (2013.01); *G06F 17/30371* (2013.01); *G06F 17/30477* (2013.01)

(58) Field of Classification Search
None
See application file for complete search history.

(56) References Cited

U.S. PATENT DOCUMENTS

| 6,839,701 | B1 * | 1/2005 | Baer et al. .......................... 1/1 |
| 7,974,942 | B2 * | 7/2011 | Pomroy et al. ................. 707/610 |
| 2004/0267722 | A1 * | 12/2004 | Larimore et al. ................. 707/3 |
| 2008/0313213 | A1 * | 12/2008 | Zhang et al. ................... 707/102 |

OTHER PUBLICATIONS

International Search Report for PCT Application No. PCT/EP2009/063331, filed Jul. 5, 2012, 3 pages.
Seo et al. "An Efficient Inverted Index Technique for XML Documents Using RDBMS", Information and Software Technology, Elsevier, Amsterdam, NL vol. 45, No. 1, Jan. 1, 2003, 12 pages.
International Search Report for PCT Application No. PCT/EP2009/063331, mailed Jul. 5, 2010, 3 pages.
Written opinion issued for PCT Application No. PCT/EP2009/063331, mailed Jul. 5, 2010, 4 pages.
International Preliminary Report on Patentability issued for PCT Application No. PCT/EP2009/063331, mailed Sep. 2, 2011, 5 pages.

(Continued)

*Primary Examiner* — Sangwoo Ahn
(74) *Attorney, Agent, or Firm* — Sprinkle IP Law Group

(57) ABSTRACT

The present invention provides a method for performing transactions on data entities in a database and a transactional database. The database comprises an ordered set of data stores with at least one static data store, wherein said static data store uses an index structure based on a non-updatable representation of an ordered set of integers according to the principle of compressed inverted indices. The method allows to generate a modifiable data store when the performed transaction comprises an insert, update or delete operation, to execute operations of the transaction on the ordered set being present at the time when the transaction has been started and, if present, on the modifiable data store and to convert data stores to a new static data store, The insert, update or delete operation are executed on the modifiable data store which is the only data store modifiable for the transaction.

20 Claims, 18 Drawing Sheets

(56) References Cited

OTHER PUBLICATIONS

Examination Report issued for U.S. Patent Application No. 09 755 851.4, mailed Apr. 18, 2013, 7 pages.

Examination Report issued for U.S. Patent Application No. 09 755 851.4, mailed Nov. 22, 2013, 7 pages.

Examination Report issued for European Patent Application No. 09 755 851.4, mailed Sep. 9, 2014, 7 pages.

* cited by examiner

METHOD FOR PERFORMING TRANSACTIONS ON DATA AND A TRANSACTIONAL DATABASE

TECHNICAL FIELD

The invention generally relates to database technology. In particular, the invention relates to a method for performing transactions on a database, and a database. More particular, the invention relates to a method for performing transactions on a database providing support for natural language text attributes and a database providing sufficient support for natural language text and transactional capabilities on natural language text.

BACKGROUND ART

Persistence stores (databases) as generally known in the art have been specifically designed for specific application domains. For example, relational databases (RDBs) started off being optimized for on-line transactional processing (OLTP) applications, and on-line analytical processing (OLAP) engines were optimized for decision support systems (DSS). To some degree RDBs have evolved to also support DSS applications, but specialized engines still dominate in that domain.

Relational databases (RDBMSs) are the dominant form of commercial databases available today. The key advantage of RDBMSs is a declarative query language that provides flexibility in expressing unanticipated access paths. Although the commercial RDBs have attempted to become "universal databases" usable with each application domain, they have been developed and were optimized for OLTP type applications that have very simple and restrictive data modelling needs and a particular pattern of updates and accesses that are not necessarily applicable to other application domains.

Thus, RDBMS used with OLTP systems do neither provide adequate support for rich flexible data models nor for full text and natural language.

Furthermore, XML databases are known in the art which are based on the concepts of the extensible markup language (XML) used to for document markup. Certain enhancements introduced in XML have been proposed in the art to use XML as a general model for a serialized representation of arbitrary data structures for communication or storage purposes. It has been observed that a means to query data modelled in XML and directly producing XML within a query could reduce some of the issues with the relational models (e.g., the rigid structures for both application modelling and the result structures). A big difference with the XML databases is the use of a similar declarative query specification, even though there is still a primary hierarchical access view.

XML/RDF (resource description framework) databases (e.g., graph databases) are typically implemented on top of relational databases. Support for natural language is thus missing. Therefore, a performance penalty is the result.

The last relevant category of database systems are those built around a graph data model. As is the case with the XML databases these are relatively immature systems in many areas compared with relational systems. However, they have the advantage of not being restricted by the need to support the large legacy of those commercial systems.

Further models include full text systems and specific OLAP systems. However, the full text systems neither support rich flexible data models nor transactions and the OLAP systems neither support full text/natural language specific things nor transactions and also no flexible data models which would imply at least the possibility to delete/change entities.

Transactional persistence stores such as described above rely heavily on a single logical disk based updatable data structures for their value and index storage. All reads during query evaluation primarily access this store. Throughout the transactions any changes made to the global store are seen by the transaction. They work either by writing directly in place to the updatable structures during the transaction and maintaining information to roll back these changes in the event of transaction failure, or by keeping structures for the effect of changes in a transaction in parallel to the global state of the database system. After or when the transaction is committed the changes are made to the updatable structures. In the latter case the union of the disk based structure and the changes are seen by the transaction reads.

Database systems as known in the art usually have three primary disk based storage structures such as persistent transaction logs that are required for recovering from system failure, value stores that contain the current state of the system, and indices that support accelerated evaluation of certain queries. There is, particularly, a broad range of structures that have been developed for the values stores and the indices. In the following, the significant options for value stores and indices such as known in the art will be exemplified.

In general, value stores maintain the state information about the entities and relationships stored in the persistence system. There are two primary forms known in the art for maintaining this state: a row oriented approach or a column oriented approach.

Known relational databases systems have a data model of a set of relations that are highly regular structures. Typically, such systems store each of these tables in rows major order with each row residing in single physical disk pages. In the event that a projection or query evaluation operation only needs to access the elements contained in a single row that row can then be accessed with a single logical Input/Output (IO) operation. Much of the effort in developing such systems has concentrated on attempting to allow many of these accesses to get their information from main memory buffers, avoiding the need for corresponding physical IOs. However, each entity that does not fit within a page will often require additional access during evaluation or projection. This is often the case with enterprise content management (ECM) data in which the entity types do not map well to a simple relational schema, and there are large textual fields that cause even single entities to overflow the space available in single disk pages.

With row oriented stores where full table scans are required during query evaluation (e.g., if there is a predicate on a table for which there is no corresponding index) much IO may be spent on retrieving data that is not required to perform the evaluation. This is generally sequential IO which has a significant performance advantage over random IO. The advantage is large enough that even in the event that an index does exist to support a particular predicate, the table scan may still be more efficient than the use of the index if that would lead to large numbers of random row accesses. This is particularly the case when there is more than one predicate on the same table, one with an index and one without. The information retrieved may also potentially pollute the memory buffers used by the system to avoid other IOs. Much prior art has been developed in the areas of query optimizers and buffer management to mitigate these problems, but there are still situations in which these problems surface.

Another area that has been explored for reducing the intrinsic IO costs noted above involves using various row oriented compression mechanism. The effectiveness of these approaches is constrained by the need to randomly access individual rows. This generally limits the approaches to the use of simple stochastic models yielding compression rates on the order of 2 or 3 to 1.

A further issue with row oriented approaches when dealing with flexible schema structures is that they can result in very sparse relations, with many cells containing NULL values to indicate that the corresponding entry is not set. Again, there has been much work on addressing the costs of such NULLs in the context of row oriented stores, however the cost can still be significant.

Column oriented value stores are often used in OLAP type systems that want to perform aggregation operations on individual fields. For entities with large numbers of attributes the IO requirements for such aggregations can be significantly reduced relative to retrieving all rows in a row oriented value store and pulling out the needed field. However, a column orientation can be very expensive, relative to a row oriented store, for non-memory resident data sets to do projection of large numbers of attributes. To counteract this there are often more compression options available than for row oriented stores.

Another problem that arises with column based stores is the need to update each column for each attribute that is involved in any update. The batch based update mechanism employed by many of the systems that use column oriented value stores gets around these problems but eliminates the ability to perform online transactional updates. For applications, that have flexible schemas, or schemas with many entities with large numbers of attributes, but generally project a relatively small subset of those fields, a materialized view row orientation (that can be seen as a hybrid of row and column orientation) can yield the best performance.

Most specialized text search engines concentrate on their index structures rather than their system state. However, one common projection requirement for text engines is a presentation of what are known as dynamic summaries. The dominant mechanisms for producing such summaries involve the retrieval of the entire document content from some stored form and either a scan of the document looking for some sentences (or passages) that are most relevant to the query, or using location information produced by the indexing system to select some character sequences that contain the text that is most relevant. The latter approach requires the indexing system to identify such sequences which is often not available when document level statistical relevance ranking approaches are employed. For their metadata these text engines employ a general row or column based approach.

Indices are redundant representations of the information in the value stores that support accelerated performance of certain operations, typically selection or filtering but indices have also been specified to accelerate operations such as joins and grouping and aggregation. Filtering indices are basically mappings from one or more keys to the set of entities that match that key in some fashion. Join indices identify pairs of entities that satisfy some join condition. Projection and bit mapped indices are often used to support grouping and aggregation operations.

There are a few important characteristics to be considered for filtering indices. The characteristics are: Does the index cover the entity set with respect to its keys, is the key set disjoint or overlapping, and is the index augmented or a multi-levelled? These characteristics will be described next in more detail.

With respect to the coverage of the entity set, a non-covering index would probably be a lot smaller than a corresponding covering index.

For a disjoint key set query predicates that correspond to multiple keys (e.g., a range predicate over an index in which each key corresponds to a unique value) will need to perform the union of the portions of the index corresponding to each involved key. In overlapping indices query predicate may be constrained by some logical combination of keys. For example a date range index could have keys for individual days, weeks, months and years. The entries for a particular week would be the union of the entries for the days in that week, but the evaluator can avoid the cost of doing the union at query time by using the appropriate week key. Such indices are redundant and so incur both a space and maintenance cost, but for certain predicates this may be worth the expenditure.

Augmented or multi-level indices in which the keys identify the entities that satisfy some predicate, and some form of auxiliary information or auxiliary index supports the identification of subsets of those entities that satisfy some finer grained predicate. For example, some index could identify that some word xyz occurred in one of the attributes of an entity. If such predicates were common this could be a useful index. However, there may also be predicates that are looking for xyz only within attribute A. If this were also common, but less so than the attribute agnostic predicate one could augment the index entries with the identification of the attribute(s) of the entity in which the word occurred, or provide subset indices for particular attributes that provided the same information.

The most common filtering index structure in standard databases is the known BTree which has many variants. The BTree supports log time random updates, although the base of the log with respect to page access (and correspondingly logical IO accesses) is generally very high, and a relatively small main memory "cache" of at least the top levels of the tree can limit average numbers of IOs per random access request to 1 or even lower. However, committing information to the persistence store will require physical writes of all affected pages (usually 1). In some systems such physical updates are postponed to a batch type process, while an in-memory structure maintains the information on the changes since the last batch run. The row/entity references associated with each key can be either logical or physical addresses of the location of the row. Logical addresses provide an additional degree of freedom in re-arranging the referenced entities. BTrees efficiently support both equality and to some degree range predicates. The latter generally requires some re-ordering of the addresses, if there are other predicates for which there are indices or if the corresponding rows need to be retrieved, to avoid disk thrashing.

Among the common variants/implementations of BTrees is a compressed version that takes advantage of the ordering to avoid fully representing the values that repeat between consecutive rows. This can significantly decrease the space needed for an index relative to a naïve representation and provide corresponding increases in the hit rate for a given amount of main memory available to cache the index pages. A variant that is sometimes used with indices over entities with small numbers of fields (e.g., 2-4) is to use the compressed BTree index as the value representation for the extent/table. Recent results have used dictionaries to map the keys in the index tuples into integers identifying elements in some dictionary. This mechanism can further reduce the space costs of the index, with a trade-off of some potential additional cost in maintaining and using the dictionaries.

Other filtering index types are generally optimized for specific data types and the common predicates on such types where these are poorly supported by BTree indices. For example, geographic region types and predicates for overlap and containment are supported by options such as KDTrees.

Inverted indices are primarily used to support fine grained predicates on potentially large textual values. In full text engines such indices also maintain auxiliary information needed to support a fuzzy evaluation of the "relevance" of an entity to a query and some form of phrase or proximity checking. These indices generally produce large numbers of index points for each entity. Although the contents of such indices are similar to the compressed BTree indices with appropriate fields, the large numbers of index points associated with each entity mean that the update costs of individual BTree index entries is generally too expensive. These systems generally then use batch update mechanisms and do not support traditional database concurrency control. In an inverted index the set of entity references associated with a particular key are referred to as the postings list for that key.

With respect to transaction management as known in the art there is a logical view of the isolation between process and the mechanisms used to implement this isolation. According to the prior art, the isolation possibilities are partitioned into four levels: serializable, repeatable read, read committed, and read uncommitted. The implementation mechanisms are generally divided into pessimistic and optimistic concurrency control. The potential concurrency supported generally increases as one descends the isolation levels at the cost of introducing inconsistencies in the database. Pessimistic implementations generally use some form of locking and updates are applied directly to a single updatable store. All transactions read from this single store, and isolation is generally achieved by some appropriate form of locking. Optimistic mechanisms have each transaction maintain some form of lookaside copies of some of the database state, including at least the changes made in that transaction. On commit these changes are checked against conflicts with changes made by other transactions that have been committed. If the check indicates no conflicts the corresponding changes are made to the updatable on-disk data structures that store the current database state. If there is any conflict the transaction is forced to rollback, although that is cheap since it merely involves dumping the lookaside. The costs associated with the lookaside and the conflict resolution depend on the isolation level. In those applications which have a low probability of conflict the optimistic mechanism can be much more efficient than the pessimistic one, although the reverse can be true when there is a high probability of conflict.

SUMMARY OF INVENTION

It is a first object of the present invention to provide a method allowing to perform transactions on a database and a transactional database, to store large amounts of data irrespective of their type and to execute operations of said transactions with high performance and low costs also in the case of large amounts of data.

It is a second object of the present invention to store the data in the database in a compact form and to provide a flexible data model allowing to vary stored data on a data entity basis.

Further objects of the present invention are to provide a method allowing to perform the transaction on a database providing support for natural language text, perform the transaction one multiple data stores ensuring the consistency of data, and further reduce the semantic gap between data and queries.

The first object is achieved according to an embodiment of the present invention by a method for performing transactions on data entities in a database. Each transaction comprises one or more query, projection, insert, update, and/or delete operations. The database comprises an ordered set of data stores with at least one static data store for storing data entities and performing queries on said data entities. The static data store uses an index structure which is based on a non-updatable representation of an ordered set of integers according to the principle of compressed inverted indices. Each of said data entities comprises a unique identifier and a plurality of fields each containing a single or multi valued value. The method comprises for a transaction the steps of: determining the current ordered set of data stores when said transaction is started, storing information of said current ordered set of data stores as transactional state for said transaction. When said transaction comprises an insert, update or delete operation, the method further comprises generating a modifiable data store and adding said modifiable data store as newest data store to said transactional state for said transaction, wherein said modifiable data store is adapted to store data entities and to perform queries on said stored data entities, executing said one or more operations of said transaction on the data entities in the data stores of which information has been stored in said transactional state. When said transaction is committed and if said modifiable data store has been generated for said transaction, the method further comprises adding said modifiable data store as newest data store to said ordered set of data stores. When one of said one or more operations of said transaction is a query operation with a query, said step of executing comprises performing said query against each of said data stores of which information has been stored in said transactional state, wherein said query returns ordered identifiers of data entities for each of said data stores that match with said query, masking for each of said data stores those of said returned ordered identifiers for which a data entity with the same identifier already exists in a newer data store, uniting said masked identifiers and returning said united identifiers. When one of said one or more operations of said transaction is an insert operation for inserting a new data entity, said step of executing further comprises writing said new data entity in said modifiable data store, wherein a new unique identifier is used as identifier for said new data entity. The method further comprises converting one or more selected data stores of said ordered set of data stores to a new static data store, wherein said converting step further comprises: reading all data entities from said one or more selected data stores, masking for each of said one or more selected data store said read data entities for which a data entity with the same identifier already exists in a newer data store of said ordered set of data stores, merging said masked data entities, building a new index structure using the identifiers of said merged data entities for said new static data store, wherein said new index structure is based on said non-updatable representation of an ordered set of integers according to the principle of compressed inverted indices, writing said merged data entities into said new static data store, adding said new static data store to said ordered set of data stores and deleting said one or more selected data stores from said ordered set of data stores.

Thus, the present invention provides a database (persistence store) that supports update and query mechanisms against a flexible data model, particularly an entity/relationship (ER) model, by supporting data entities having a plurality of fields each containing a single or multi-valued value.

The present invention also achieves to reduce the semantic gap between applications operating on the database by transactions and the database (persistence store data model) and query views by the steps of performing the transaction. Such a reduction simplifies the process of developing applications that rely on scalable and transactional persistence stores. The present invention thus efficiently supports transactions with a read consistent isolation level and provides ACID properties in the context of transactions that often contain data that produce large numbers of random value or index update points by the provision of the transactional state and the modifiable data store.

The invention furthermore provides an efficient concurrency control mechanism that exploits the transactional characteristics of the applications by the transactional state and the modifiable data store. In detail, commit time costs (i.e., time needed to commit a transaction) are minimized by creating a new modifiable data store as read only store and maintaining the global state of the database as an ordered set of data stores which may be memory resident or disk resident. The read only nature of these data stores achieves to minimize their space and access costs.

The method according to the present invention also allows to store data in the database in a compact form using said non-updatable index structure wherein said non-updatable index structure facilitates that query operations are performed in a suitable short period, even when the data amount stored in said database become large, and allows to update the data stored in said static data store using said compact form in a manner complying with known transactional criteria. Furthermore, the method provides a new isolation level for transactions wherein the data to be seen by the transaction is read consistent which means that the state of data actual at the time when a transaction is started is remained constant for said transaction until the transaction changes the state of data.

According to an embodiment of the present invention, when one of said one or more operations of said transaction is a projection operation for reading at least one field of an existing data entity of which the identifier is one of the identifiers returned by said query operation, said step of executing may further comprise reading said single or multi valued value in said at least one field of said existing data entity, returning said single or multi valued value.

Therefore, the method facilitates to return by masking only the newest instance of queried data entity fields from the database, irrespective whether and how often the data entity field has been changed. That is, the internal storage of data entities in static or modifiable data stores are efficiently hidden from the querying user or application such that the user or the application only see, at each time, the newest (present) instance of the queried data entity field which has been committed prior to the transaction started by the user or the application. Thus, the method provides data consistency for the query results.

According to an embodiment of the present invention, when one of said one or more operations is an update operation for updating at least one field of an existing data entity of which the identifier is one of the identifiers returned by said query operation, said step of executing may further comprise executing said projection operation for reading at least those fields of said existing data entity not to be updated, writing a new data entity corresponding to said existing data entity in said modifiable data store, which comprises the fields of said existing data entity not to be updated, said at least one updated field and said identifier of said existing data entity as identifier of said new data entity.

Thus, the method allows to update existing data entities without the need to change instances of said data entities being stored in prior static or modifiable data stores, rather storing updated data entities in the modifiable data store generated for the transaction whereby the update operation can be executed with low costs.

According to an embodiment of the present invention, when one of said one or more operations is a delete operation for deleting at least one field of an existing data entity of which the identifier is one of the identifiers returned by said query operation, said step of executing may further comprise executing a projection operation for reading at least those fields of said existing data entity not to be deleted, writing a new data entity corresponding to said existing data entity in said modifiable data store, which comprises the fields of said existing data entity not to be deleted, and said identifier of said existing data entity as identifier of said new data entity.

The method facilitates the deletion of several fields of existing data entities without changing the non-updatable index structure or the storage of the existing data entities in prior static or modifiable data stores and thereby the deletion operation can be performed in shorter time compared to that according to the above mentioned prior art systems.

According to an embodiment of the present invention, when one of said one or more operations is a delete operation for deleting an existing data entity of which the identifier is one of the identifiers returned by query operation, said step of executing may further comprise writing a new data entity corresponding to said existing data entity in said modifiable data store, which comprises a marker and said identifier of said existing data entity as identifier of said new data entity, wherein said marker indicates that said corresponding existing data entity is deleted.

By writing said data entity to be deleted into said modifiable data store, the delete operation can be executed with low costs due to not changing the index structure or the read-only data stores of the transactional state.

According to an embodiment of the present invention, the method may further comprise deleting said one or more selected data stores which have been deleted from said ordered set of data stores.

The method facilitates to efficiently use resources of a computer system, on which the method is executed, whereby, for example, disc space of a hard drive incorporated in said computer system may be freed by deleting unused data stores.

According to an embodiment of the present invention, each of said static data stores may further comprises at least one mask containing identifiers of data entities to be used in said masking step of said query operation and said converting step, wherein those returned identifiers are masked for which the same identifier exists in said at least one mask of said newer data store, and said converting step further comprises: generating said at least one mask containing at least those identifiers of the merged data entities which do not occur in data stores older than said one or more selected data stores.

The method allows to further speed up the query operations according to the embodiments herein defined since the pre-generated mask can be used to mask the identifiers instead of to perform separate query in each of the data stores.

According to an embodiment of the present invention, said database may support natural language text and at least one of said plurality of fields of said data entities comprises a natural language text value containing a plurality of words.

The meritorious effects of the method according to the present invention additionally emerges when the data stored in the database is of natural language text such as complete content of written documents or the documents itself along with additional information such as meta information since such data can be handled irrespective of their specific type with the same performance as compared to, for instance, single value integer data entities. The semantic gap is further reduced by including the support for natural language full text values and both crisp and fuzzy query mechanisms.

According to an embodiment of the present invention, said database may further comprise a dictionary including a mapping from words to wordindices and said new index structure is built on a field of said data entities, wherein said field comprises said natural language text value, and said step of building the new index structure further comprises: mapping a word of said natural language text value to a corresponding wordindex using said mapping of said dictionary, mapping a pair comprising said wordindex and an identifier of a merged data entity to an integer of said ordered set of integers, if said new static data store contains said data entity and said field containing said word or a form of said word.

The method allows to store data in said compact form since only said wordindices need to be stored in the data stores instead of complete words or word combinations. Thus, the capacity of storage media comprising the data stores can be utilized efficiently.

According to an embodiment of the present invention, said new index structure may further comprise blocks of consecutive integer entries of said ordered set of integers and a search tree, wherein each of said blocks contains a predefined number of chunks each having a predefined number of integer entries, and said step of building said new index structure further comprises: partitioning said ordered set of integers into blocks comprising a number of N×M integer entries, wherein N is said predefined number of chunks and M is said predefined number of integer entries, partitioning each of said blocks into chunks of said predefined number of integer entries, computing deltas of consecutive integer entries in each of said chunks, determining the maximum of said deltas and computing an entry-size from said maximum, wherein said entry-size is the size needed to write said maximum in an entry, consecutively writing said deltas in entries having said entry-size, storing the offset of each of said chunks and its starting value in the header of the corresponding block, building said search tree having a node for each of said blocks, wherein said node consists of a value of the first integer entry in said block and a pointer to the position where said block starts.

The index structure based on a non-updatable representation of an ordered set of integers according to the principle of compressed inverted indices allows to store the data in the static data store and indices thereto in a compact form and facilitates that search operations for indices in said index structure can be executed with good performance and low costs.

According to an embodiment of the present invention, said step of converting may further comprise storing each of said identifiers of said data entities stored in said new static data store and an unique subset identifier provided in said new static data store which is mapped to said identifier in a store subset provided in said new static data store, storing a field name for each of said fields of said data entities stored in said new static data store and an offset associated with each field name in a field map provided in said new static data store, and storing said single or multi valued value of each of said fields of said data entities stored in said new static data store which are designated by the same field name in a field store provided in said new static data store, wherein said offset defines the position of said field store in said new static data store.

The method according to the above embodiment achieves additional compact storage of data in said static data store since the identifiers stored in association with the fields of the data entities can be kept small even in the case when the number of data entities stored in the database and thus, the unique identifier provided in the database for each data entity is large.

According to an embodiment of the present invention, each of said data stores may be adapted to store relations between data entities, wherein a relation comprises an unique identifier and a plurality of fields each including one or more identifiers of said data entities which are included in said relation.

Since the relations between data entities are handled by the method in the same way as data entities only consisting of values, the same meritorious effects as described with respect to compact storage of said data entities and the ability to perform transactions according to the present invention are also present with respect to the relation. Thus, the capabilities of the database, on which the transactions according to the above method are performed, are advanced towards a compact and flexible entity-relations-database.

According to an embodiment of the present invention, said query operation may support full text query and/or said query operation provides crisp and fuzzy query evaluation.

Especially with respect to natural language text data wherein different forms of words may occur, results of query operations comparing given words to be queried with stored words are improved since also those forms of stored word are found as results of the query operations which are not identical but similar to the given words. The semantic gap is further reduced by including the support for both crisp and fuzzy query predicates.

According to an embodiment of the present invention, said database may further comprise a query language, wherein each query operation uses said query language to define queries based on navigational expressions along relations, Boolean predicates, crisp and natural language text predicates, and combinations thereof.

It is advantageous to provide a query language within a database and used to perform transactions on the database wherein the form and structure of said operations are predefined and formalized since operations of transaction being defined using the query language can be easily evaluated and performed.

According to an embodiment of the present invention, when one of said one or more operations of said transaction is an insert, update or delete operation, said step of executing may further comprise: storing said insert, update or delete operation in a transactional log provided in said database, wherein said transaction log corresponds to said modifiable data store on which said insert, update or delete operation is executed.

The method provides a mechanism which allows to re-execute, in a case of loss or damage of the modifiable data store on which operations have been performed, those of the operations which have been performed prior to the loss or damage. Thus, the method improves the durability of the data stored in the database.

According to another embodiment of the present invention, a database is provided which comprises an ordered set of data stores with at least one read-only static data store adapted to store data entities and to perform queries on said data entities, wherein said static data store uses an index structure which is based on a non-updatable representation of an ordered set of integers according to the principle of compressed inverted indices, wherein each of said data entities comprises an unique identifier and a plurality of fields each including a single or multi valued value, means for controlling transaction, wherein each transaction comprises one or more query, projection, insert, update, and/or delete operations, and means for converting one or more selected data stores of said ordered set of data stores to a new static data store. The means for controlling transaction is adapted to perform for a transaction the steps of determining the current ordered set of data stores when said transaction is started, storing information of said current ordered set of data stores as transactional state for said transaction, when said transaction comprises an insert, update or delete operation, generating a modifiable data store and adding said modifiable data store as newest data store to said transactional state for said transaction, wherein said modifiable data store is adapted to store data entities and to perform queries on said stored data entities, executing said one or more operations of said transaction on the data entities in the data stores of which information has been stored in said transactional state, when said transaction is committed and if said modifiable data store has been generated for said transaction, adding said modifiable data store as newest data store to said ordered set of data stores. When one of said one or more operations of said transaction is a query operation with a query, said means for controlling transaction is further adapted to perform said step of executing by performing said query against each of said data stores of which information has been stored in said transactional state, wherein said query returns ordered identifiers of data entities for each of said data stores that match with said query, masking for each of said data stores those of said returned ordered identifiers for which a data entity with the same identifier already exists in a newer data store, uniting said masked identifiers and returning said united identifiers. When one of said one or more operations of said transaction is an insert operation for inserting a new data entity, said means for controlling transaction is further adapted to perform said step of executing by writing said new data entity in said modifiable data store, wherein a new unique identifier is used as identifier for said new data entity. The means for converting one or more selected data stores of said ordered set of data stores to a new static data store, wherein said means for converting is adapted to perform the steps of: reading all data entities from said one or more selected data stores, masking for each of said one or more selected data store said read data entities for which a data entity with the same identifier already exists in a newer data store of said ordered set of data stores, merging said masked data entities, building a new index structure using the identifiers of said merged data entities for said new static data store, wherein said new index structure is based on said non-updatable representation of an ordered set of integers according to the principle of compressed inverted indices, writing said merged data entities into said new static data store, adding said new static data store to said ordered set of data stores and deleting said one or more selected data stores from said ordered set of data stores.

The database according to this embodiment allows to store data in a compact form using said non-updatable index structure wherein said non-updatable index structure facilitates that query operations are performed in a suitable short period, even when the data amount stored in said database become large, and allows to update the data stored in said static data store using said compact form in a manner complying with known transactional criteria.

The means for controlling transaction and the means for converting of the above embodiment may further be adapted to perform the steps according to the above described embodiments of the method.

Further embodiments of the present invention provides a computer program which, when executed on a computer, adapts said computer to perform the methods according to embodiments of the present invention, and a storage medium, on which said computer program is stored so that it is readable by a computer.

Thus, the method according to the present invention can be executed on a suitably equipped computer system, such as a server computer connected to a client computer via a network connection, or any other computer or data processing system suitable for running a database system.

BRIEF DESCRIPTION OF DRAWINGS

Further advantageous embodiments and aspects of the present invention are disclosed and will become more apparent by the accompanying drawings described in the following and illustrating an implementation and exemplary embodiments of the present invention and, together with the description and the appended claims, serve to explain the advantages and principles of the invention.

In the drawings.

DESCRIPTION OF EMBODIMENTS

Figure 1:
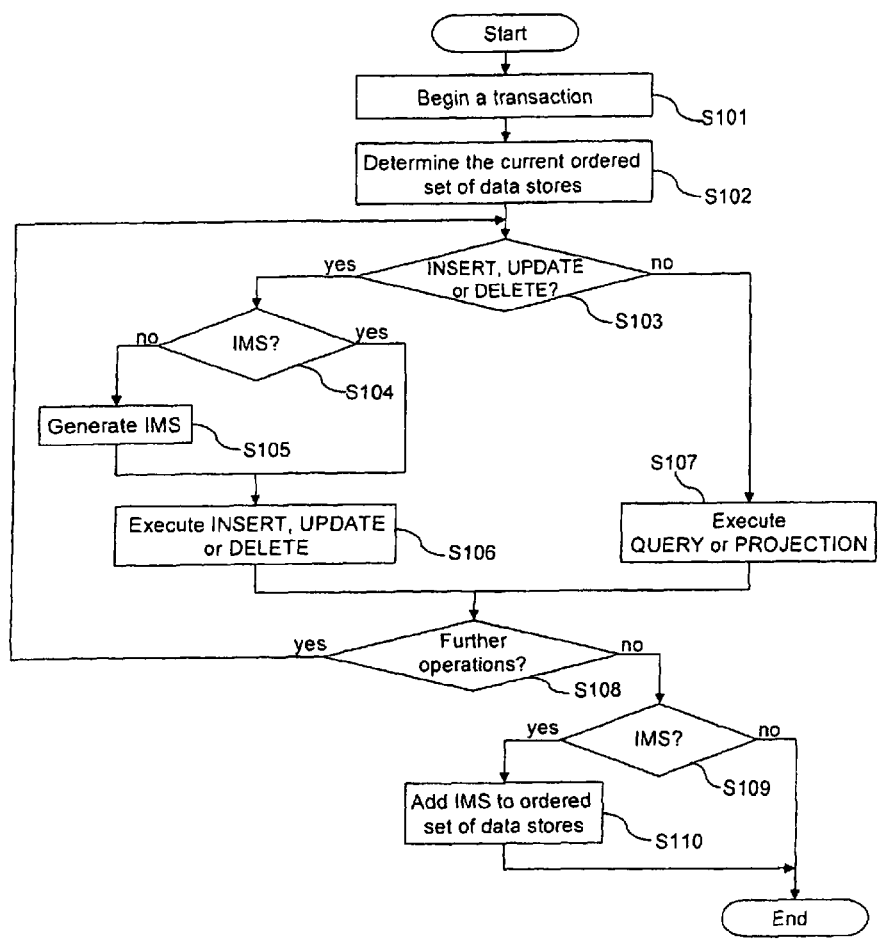
FIG. 1 is a flowchart showing the steps performed in a transaction according to an embodiment of the present invention.

Reference will now be made in detail to embodiments consistent with the present invention as illustrated in the accompanying drawings. Whenever possible, the same reference numerals will be used throughout the drawings and the following description to refer to the same or like parts.

The following definitions will be used throughout the description of the embodiments:
(1) The static data store and the modifiable data store will also be referred to as static node store (SNS) and in-memory node store (IMS), respectively.
(2) The index structures which are based on a non-updatable representation of an ordered set of integers according to the principle of compressed inverted indices will be referred to as ordered unsigned integer sets (OUIS).
(3) The ordered set of data stores in the database will be also referred to as global state.
(4) Identifiers will also be designated as IDs.

Furthermore, transactions according to the following embodiments may comprise one or more query, projection, insert, update, and/or delete operations, and treated in a coherent and reliable way independent of other transactions. The transactions according to the embodiments hereinafter described comply with the known principles of transactions, namely in that the transactions are atomic, consistent, isolated and durable (ACID). That is, transactions according to the following description provide an "all-or-nothing" proposition, i.e., each operation is either completed (also referred to as finalized or committed) in its entirety or had no effect whatsoever. Furthermore, transactions are isolated from other transactions, results are in conformity to existing constraints provided in the database, and successfully committed transactions are written to durable storage.

The database according to the embodiments described hereinafter comprises an ordered set of data stores with at least one static data store. The data stores may preferably be ordered in a timely manner. The time stamp of a data store may be defined in the case of a modifiable data store, by the time when the transaction which has generated that modifiable data store has been started, or in the case of a static data store, by the time of the earliest one of data stores which have been selected to be converted to that static data store. The ordered set of data stores may be provided as a global state within the database which may preferably comprise references to the data stores and further information on the data stores, such as time information or information with respect to their accessibility.

The at least one static data store is adapted to store data entities and to perform queries on said data entities and may be stored as a persistent data store on a hard disk of a computer system. The static data store uses an index structure which is based on a non-updatable representation of an ordered set of integers according to the principle of compressed inverted indices which will be described below in more detail.

The data entities stored in the static data store may comprise a unique identifier and a plurality of fields each containing a single or multi valued value. The unique identifier may be provided globally in the database to identify a data entity within a database, irrespective of the number of data stores, biunique and may be an unsigned integer of a globally provided ordered set of unsigned integers in the database. Each of the plurality of fields may refer to a specific type of values or to multiple different types of values such as integer typed values or full text typed values. That is, each of the single or multi valued values stored in a field refer to the specific type.

The queries are preferably at least elementary similar to constructs known in the art such as the SELECT-operation in SQL. However, the queries may be formulated in any other query language which is preferably provided in the database such as described below in more detail. The queries may be defined based on navigational expressions along relations, Boolean predicates, crisp and natural language text predicates, and combinations thereof using the query language.

An embodiment of the present invention will now be described with reference to FIG. 1 which shows a flowchart of the steps performed in a transaction.

A new transaction S101 may be initiated by a user or an application. The initialization of the transaction may comprise further steps (not shown) such as establishing a connection between the user or the application and the computer system which provides a database management system including the database according to the present embodiment, authorizing the user or the application and checking the permissions of the user or the application to perform operations on the database.

If the transaction has been successfully initiated in step S101, the current ordered set of data stores (also referred to as global state) is determined and the information obtained from the current ordered set of data stores is stored as transactional state of the transaction S102. The transactional state may comprise references to the data stores being present in the current ordered set of data stores at the time when the transaction has been started, similar to the global state. Thus, the transaction is enabled to perform operations on the data stores being present in the transactional state only. Thereby, isolation of transactions is achieved since the transactions can be performed independent from other transactions. Accordingly, the modifiable store generated by the transaction is not present in the ordered set of data stores while the transaction is executed, and therefore not visible and not accessible for other transactions, thereby ensuring consistency of the transactions.

As mentioned above, the transaction may comprise one or more query, projection, insert, update, and/or delete operations. In one preferred embodiment, when it is determined that the operation to be executed next is an insert, update or delete operation S103, the following steps are performed before this operation will be executed.

If it is determined that the insert, update or delete operation to be executed next S102 is the first of such operations to be executed in the present transaction, and that a modifiable data store has not been generated for the present transaction S104, the modifiable data store is newly generated S105 for the transaction. Furthermore, the information on the generated modifiable data store may be added to the transactional state of the transaction indicating that the modifiable data store is the newest data store. To determine if a modifiable data store has been generated for the transaction, the transactional state may be searched for such a modifiable data store, for example, based on a comparison of the generation time of the modifiable data stores within the transactional state and the time when the transaction has been started. When it is determined that the generation time of a modifiable data store within the transactional state and the time at which the transaction has been started are equal, then a modifiable data store has already been generated for the transaction. However, any other suitable method for determining if the modifiable data store has already been generated for the transaction may be applicable.

In a further embodiment of the present invention, the modifiable data store may be generated before the first operation of the transaction is executed irrespective of whether it is an insert, update, delete, query or projection operation. That is, the modifiable data store may be generated before, in parallel or after step S102 as shown in FIG. 1 is performed.

The generated modifiable data store is adapted to store data entities and to perform queries on the stored data entities both as described above. The modifiable data store may preferable be kept in memory during the transaction for which the modifiable data store has been generated, such that the operations executed on the modifiable data store can be performed with suitable performance without the need for accessing other storage media such as a hard disk. However, the modifiable data store may be kept in another embodiment on any other writable storage media such as a hard disk when the computer system on which the database is configured does not provide sufficient memory for keeping the modifiable data store as an in-memory data store during the transaction. It will be acknowledged by the person skilled in the art that, if the modifiable data is store is kept on a hard drive instead of the memory, the performance to execute operations on the modifiable data store is significantly reduced.

Furthermore, the modifiable data store may be structured using a row-oriented data structure, a column-based data structure such as those known from RDBs or any other suitable data structure. If the modifiable data store uses a column-based data structure, each of the fields contained in a data entity will be stored in a specific column of the data structure. For example, if a first data entity comprises field values for surname and name of persons and a second entity comprises field values for name and birth date of persons wherein both data entities are to be stored in the same modifiable data store, the modifiable data store at least comprises three columns for each of the respective fields, namely a surname, name and birth data columns. However, the row-oriented data structure is preferably used in the modifiable data store. According to the row-oriented data structure, the fields of each data entities will be stored consecutively, irrespective of their particular type. With respect to the above example, the surname and the name field of the above first data entity, and the name and the birth date field of the above second data entity will each be store consecutively so that the data entities may have the form "surname, name" and "name, birth data" when using a separation by comma.

After the modifiable data store has been successfully generated in step S105, the insert, update or delete operation may be executed on the modifiable data store since the modifiable data store generated for the transaction is the only data store in the transactional state which is writable by the transaction. Specifically, the static data stores are read-only per se since the index structure based on a non-updatable representation of an ordered set of integers according to the principle of compressed inverted indices does not allow easy manipulation of data entities without rebuilding the index structure or performing complex operations on this index structure. The above read-only characteristics of the static data store will be described below in connection with OUIS. Modifiable data stores in the transactional state which have been generated by preceding transactions are marked as read-only for further transaction when the preceding transactions are committed.

If it is determined in step S103 that the operation to be executed next is not an insert, update or delete operation, rather a query or projection operation, that operation is executed in step S107 on the data entities of those data stores of which information has been stored in the transactional state. In particular, the query or projection operation may be executed against each one of the data stores or at least one particular data store in the transactional state. The at least one particular data store may be explicitly specified by the operation.

As shown in FIG. 1, steps S103 to S107 will be repeated when it is determined in step S108 that further operations are to be executed within the transaction. Otherwise, if no further operations are to be executed within the transaction and if the transaction is to be committed, it is determined in step S109 whether a modifiable data store has been generated for the transaction or not. If so, the modifiable data store generated for the transaction is added as newest data store to the ordered set of data stores S110 provided in the database. The added modifiable data store is furthermore marked as read-only data store for further transactions started after the transaction has been committed. Thus, the ordered set of data stores thereafter comprises all static and modifiable data stores which are present and readable in the database for the further transactions. If the transaction is cancelled without committing the same, the modifiable data store generated for the transaction may be deleted and must not be added to the ordered set of data store within the database. Thus, the transactions performed according to the present embodiment comply with the principles of the atomicity and durability according to ACID as described above.

A detailed description of the execution of the above operations will be provided hereinafter. It is thereby assumed that operations are executed on a data entities level basis. That is, if a particular data entity identified by a specific identifier is present in more than one data stores of the transactional state, for example, due to an update or delete operation performed on that particular data entity, each of the more than one data stores comprises that particular data entity in a complete, but updated or partly deleted form. Thus, since the data stores of the transactional state are ordered, the particular data entity of the newest one of these data stores in which the particular data entity is present can be regarded as being the current and newest instance of the particular data entity.

The query operation defined according to an embodiment of the present invention comprises a query which is to be executed against the data entities in the data stores of the database. The query may be defined by using a query language as will be described below. The query operation is preferably executed by performing the query against each of the data stores of which information has been stored in the transactional state, but may also be performed against selected ones of these data stores.

It will be assumed in the present embodiment that a query is performed against each of the data stores.

Before the query is executed, the query definition according to the used query language may be evaluated by a query evaluator provided in the database so that it can be ensured that the query definition is consistent with the query language definitions. The evaluated query may then be transmitted to each of the data stores which perform the transmitted query independent from each other. The query against one data store may be performed as known in the art and therefore, corresponding descriptions will be omitted here.

Each of the queries returns unique identifiers of data entities which have a match with the query. If no data entities having a match with the query are found in a data store, the query may return information such as the well-known "NULL" value, indicating that no matching data entity has been found. If, unique identifiers are returned by the query, the identifiers are preferably ordered.

For example, if the query is defined to search for "name=Meier", the query returns the identifier of each data entity which comprises a field "name" and wherein at least one value of the field is equal or similar to "Meier".

As will be easily recognized by the skilled person, since one data entity can be present in more than one data store due to update or delete operations executed in preceding transactions committed before the present transaction has been started, the identifiers returned by the queries from different data stores may be comprise identical identifiers. These identifiers generally refer to the same data entities which have been updated or partly deleted before.

To achieve consistency of the identifiers such that the returned identifiers only refer to the newest instance of each of the data entities, in particular to that data store in which this newest instance is stored, a step of masking for each of the data stores those of the returned ordered identifiers for which a data entity with the same identifier already exists in a newer data store. The masking step may be performed by using the returned identifiers of a data store as mask to mask the returned identifiers of each preceding data store in the ordered set of data stores of the transactional state, beginning with the newest data store.

For example, if a query is performed against an ordered set of data store comprising data stores A, B, and C wherein data store B is newer than data store A, and data store C is newer than data store B, and the identifiers 1, 5, and 20, the identifiers 1, 10, and 20, and the identifiers 1, and 100 are returned from A, B, and C, respectively, the masking step is performed as follows.

At first, the mask is formed using the identifiers of the newest data store, namely data store C to mask the returned identifiers of each preceding data store, namely data stores A and B. Thus, since the returned identifiers of data store B also comprises the identifier 1 and 10 and the returned identifiers of data store A also comprises the identifier 1, the aforementioned identifiers are masked so that the masked returned identifiers of A are 5 and 20, and that of B is 20. Then, the masked returned identifiers of the instantaneous preceding data store of data store C, namely B, are used as mask for masking each of the preceding data stores of B. Thus, since the masked returned identifiers of A and the mask of B both contain identifier 20, this identifier is masked and the masked returned identifiers of data store A now contain identifier 5 only.

In a further step of uniting, the masked identifiers for each of the data stores remaining after the masking step may be united, for example, by using an OR gating which results in a list of unique identifiers referring to data entities stored in data stores that have a match with the performed query. The list of the identifiers after the masking and the uniting step is returned as a result of the query. With respect to the above described example, the returned identifiers comprises 1, 5, 10, 20, and 100 wherein the identifier 5 relates to data store A, the identifier 20 to data store B, and all other to data store C only.

The above described masking and uniting step may also be performed by applying an AND grating on the returned identifiers from the queries against each of the data stores. Furthermore, each of the returned identifiers may contain information to which of the data stores it refers.

The insert operation will be described next in more detail. The insert operation is adapted to insert a new data entity to the database. As described above, the insert operation may be defined using constructs of a query language such as the SQL statement INSERT. Accordingly, the insert operation may define fields and values for each of the fields to be written in the database.

Since only the modifiable data store of the transaction is writable for operations of the transaction, the insert operation writes a new data entity to this modifiable data store wherein a new unique identifier is used as the identifier of the new data entity and the fields and values as defined in the operation are written accordingly. The new unique identifier may be the next unused identifier of the ordered set of unique identifiers as provided in the database.

The projection operation may be executed according to another embodiment as follows. First of all, the projection operation may read at least one field of an existing data entity of which the identifier is one of the identifiers returned by an above described query operation executed prior to the projection operation. That means, a query operation has to be executed prior to the projection operation, and identifiers returned by the query operation will be used by the projection operation for further processing. By the way, projections in the context of the present application mean materialization of values. That is, the values of at least one field are read and returned by the projection operation.

The projection operation may read the single or multi valued value, or a part of the multi valued value stored in the at least one field of the existing data entity designated by one of the returned identifiers. Since each of the returned identifiers is masked as described above and thus refers to the newest instance of the existing data entity stored in a particular one of the data stores, the projection operation reads only the at least one field of the newest instance of the existing data entity in the particular data store. Furthermore, the projection operation returns the at least one value of that newest instance.

According to the above embodiment, the projection operation may be defined by using a query language such as the SELECT statement of SQL. In particular, the definition of the projection operation may at least contain the fields or particular values of a multi valued value field to be read. In another embodiment, the projection operation may include steps of a query operation as described above so that the separate query operation executed prior to the projection operation to provide identifiers may be omitted. In this case, the projection operation needs to define the query.

The update operation for updating at least one field of an existing data entity according to a further embodiment of the present invention may be executed as follows.

The identifier of the existing data entity may be one of the identifiers returned by a query operation executed before the update operation. At first, a projection operation as described above is executed to read at least those fields of the existing data entity which will not be updated by the update operation. Then, the update operation creates a new data entity in the modifiable data store for the transaction. The new data entity comprising the fields of the existing data entity read by the projection operation, the at least one updated field and the identifier of the existing data entity is written into the modifiable data store of the transaction.

According to one embodiment, the update operation may further include steps of a query operation so that a separate query operation executed prior to the update operation can be omitted, and/or steps of a projection operation so that the fields of the existing data entity not to be updated can be read without executing a separate projection operation.

Furthermore according to another embodiment, the projection operation may read all fields of the existing data entity and update those fields to be updated before writing to the new data entity.

The definition of the update operation may be made by using constructs of a query language such as the UPDATE statement known from SQL. However, the update operation may be defined using any other query language.

Furthermore, the delete operation according to one embodiment of the present invention may be performed as follows. The delete operation may thereby be performed on an existing data entity of which the identifier is one of the identifiers returned by a query operation executed prior to the delete operation.

If at least one field of the existing data should be deleted, a projection operation is executed to read at least those fields of the existing data entity which will not be deleted by the delete operation. Then, a new data entity is created in the modifiable data store generated for the transaction. This new data entity comprises the fields of the existing data entity read by the projection operation and the identifier of the existing data entity as the identifier of the new data entity. In another embodiment, the new data entity may further comprise a marker for each of the fields which have been deleted by the delete operation wherein the marker indicates that the respective field has been deleted.

Additionally or alternatively, if an existing data entity should be completely deleted, a new data entity may be written to the modifiable data store including a marker and the identifier of the existing data entity as identifier of the new data entity. The marker indicates that the existing data entity to which the new data entity corresponds is deleted.

In another embodiment, the delete operation may be defined using a query language wherein the definition may be similar to that of the DELETE statement known from SQL. Furthermore, the delete operation may include steps of a query operation to perform a query as described above, and/or steps of a projection operation to read fields of the existing data entity not to be deleted by the delete operation. Thus, a query operation executed prior to the delete operation and a projection operation separately executed may be omitted.

The method according to the preferred embodiment of the present invention further comprises a step of converting one or more selected data stores of the ordered set of data stores (global state) to a new static data store.

The step of converting may be executed independently from any committed or currently performed transaction in an automatic manner or due to a command issued by a management application or a user. As will be described below, the step of converting may be executed when the number of data stores in the ordered set of data stores exceeds a predefined value or when it is estimated that the complexity for converting one or more data stores to be selected exceeds a predefined condition.

The step of converting will now be described with reference to FIG. 2.

The converting step is executed S201 when one of the above situations occurs. Then, data stores of the ordered set of data stores may be selected S202. The selected data stores may comprise one or more modifiable data stores, two or more static data stores, or at least one modifiable data store and at least one static data store. The selection algorithm used by the converting step may take into consideration the number of data entities stored within each of the data stores in the ordered set of data stores, and selects data stores-until the total number of the selected data stores exceeds a predefined maximum. The selection algorithm may preferably select consecutively ordered data stores or modifiable data stores of the global state since at least the latter one preferably converted to static data stores first owing to the advantages provided by the index structure of these data stores.

In step S203, all data entities are read from the selected data stores, for example, by querying all identifiers of the data entities stored in each of the data stores and then reading all fields for each of the queried identifiers. The above step S203 may also be performed by separate execution of query and projection operations as described above.

A step of masking S205 is performed on the data entities read by the step S203 in each of the selected data stores for which it is determined in step S204 that a data entity with the same identifier exists in a newer data store of the selected data stores or, preferably, the ordered set of data stores. The step of masking S205 is executed similar to the masking step of the query operation as described above. That is, for example, if a selected data store A comprises data entities with identifiers 1, 5, and 10, and another selected data store B which is newer than A comprises data entities with identifiers 1, 10, and 20, the resulting data entities after the masking step comprises the data entities with identifiers 1, 10, and 20 of B, and data entity with identifier 5 of A. If data store B is not a selected data store, but present in the global state, then the resulting data entities only comprise data entity with identifier 5 of A.

After masking the data entities, the remaining masked data entities of the selected data stores are merged to a set of data entities S206. The merging step S206 may be done by applying an OR grating to the masked data entities of each selected data store.

As described above, the static data stores comprise an index structure based in a non-updatable representation of an ordered set of integers according to the principle of compressed inverted indices which is to be generated for a new static data store. Therefore, such a new index structure is built in step S207 using the identifiers of the merged data entities. After building the new index structure which will be described in more detail below, the merged data entities are written into a new static data store S208. Finally, the new static data store is added to the ordered set of data stores.

To maintain the ordered set of data stores, the position of the new static data store in the ordered set of data stores may be the position of one of the selected data stores and is preferably the position of the newest one of the selected data stores. However, the new data store may be set on any other position in the ordered set of data stores so that the order of the data stores with respect to the data stores not being selected can be maintained.

Furthermore, according to another embodiment of the method, a step for deleting one or more of those data stores which have been deleted from the global state of the database is performed. However, the step of deletion needs to determine if any transaction is currently performed which includes at least one of these data stores to be deleted in its transactional state. This may be the case, when the transaction has been started before the converting step, and is sill performed when the deleting step is started. If so, the respective data store may not be deleted from the database.

It has been mentioned, that operations and steps as described above are executed on a data entities level basis. However, these operations and steps may optionally be executed on a field level basis. That is, a new data entity written by an update or delete operation in the modifiable data store for the transaction does necessarily not contain the complete, but updated or partly deleted existing data entity to which the new data entity correspond. According to the embodiment, only those fields are written as new data entity which have been updated or deleted by an update or delete operation.

It will be apparent to the person skilled in the art that the above described operations and steps need to be adapted so as to be executable on a field level basis.

By way of example, the adaptation of the update and delete operation will be described. At first, the projection operation of the update and delete operation can be omitted since only the updated or deleted fields are written in the new data entity and the fields of the existing data entities need therefore not to be read. When an update operation for updating at least one field of an existing data entity is to be performed, a new data entity is written in the modifiable data store for the transaction which comprises the at least one updated field and the identifier of the existing data entity as identifier of the new data entity. Additionally, when an delete operation for deleting at least one field of an existing data entity is to be performed, a new data entity is written in the modifiable data store comprising a marker for each of the at least one deleted fields and the identifier of the existing data entities as identifier of the new data entity. In both aforementioned operations, the identifier of the existing data entity may be provided by a query operation executed prior to the respective operation or by steps of a query operation included in both operations.

Performing the operations and steps on the field level basis will advantageously lead to the effects of increased performance in update and delete operations, and further reduction in the size of the modifiable data stores, thereby providing increased compactness of the database.

However, as will be recognized by the person skilled in the art, the query operation and the converting step, especially in view of the masking and the uniting steps, need to be adapted for the field level basis additionally. The adaptation of query operation will now be exemplified.

By way of example, the necessary adaptation of the query operation may relate to dividing the query of the query operation in separate atomic queries wherein one atomic query is formed for each of the fields to be queried. These atomic queries may be executed on each of the data stores on which the query operation is to be executed. The results of each atomic query may comprise identifiers of data entities which have a match with the atomic query. The resulting identifiers may then be masked as described above. Additionally, it is to be determined if the data entities having the same identifier exist in newer data stores, irrespective of whether the identifier of the data entity in the newer data store has been returned by the same atomic query. If so, it is assumed that the data entity with this identifier has been updated or partly deleted in the respective field against which the atomic query has been performed and it can therefore be assumed that the newest instance of the data entity is present in the newer data store. The resulting identifiers remaining after such masking may then be united and returned as described above.

Figure 2:
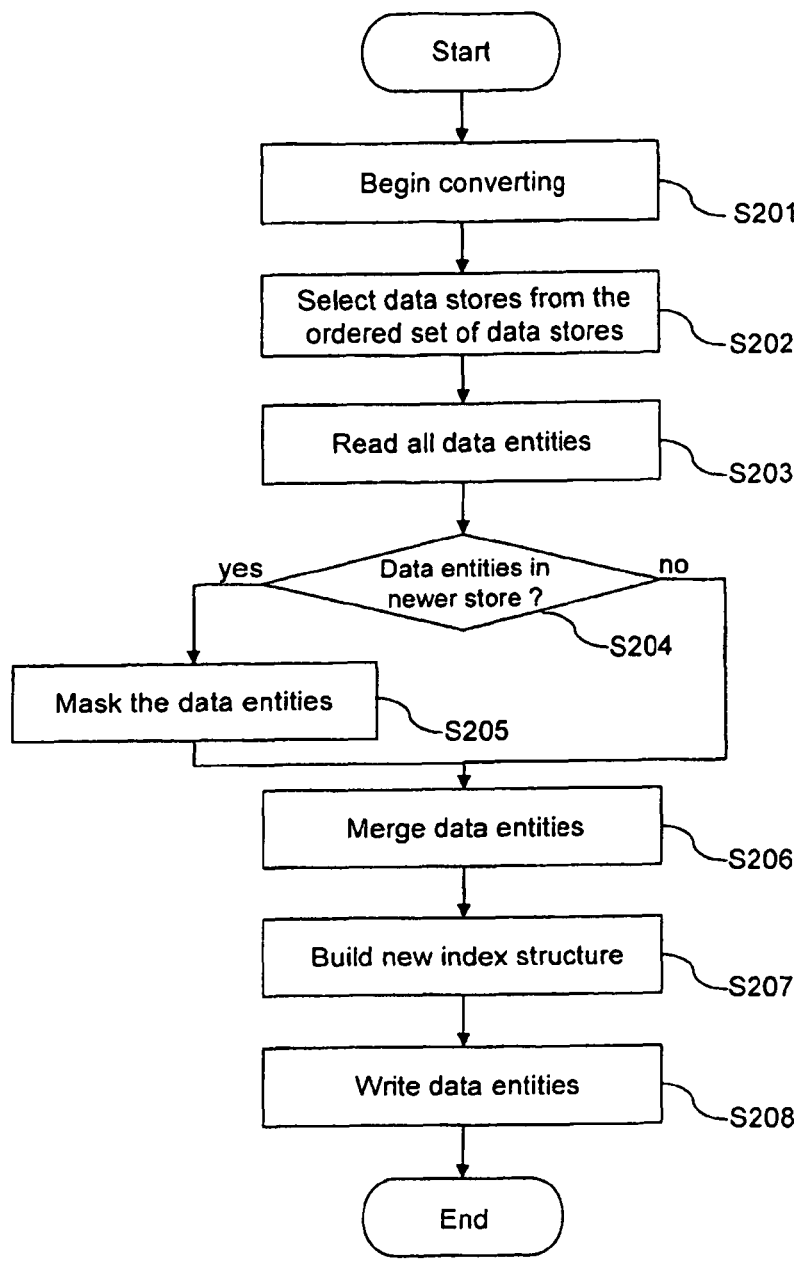
FIG. 2 is a flowchart showing the converting step according to an embodiment of the present invention.

In a further embodiment of the present invention, the above described converting step as shown in FIG. 2 may further generate at least one mask containing identifiers for the new static data store. For example, the identifiers of the merged data entities which do not occur in data stores older than the selected data stores may at least be used for the mask. The mask may then be used in the masking step of the query operation and the converting step so that those of returned identifiers can be masked for which same identifiers exist in at least one mask of a newer data store.

Figure 3:
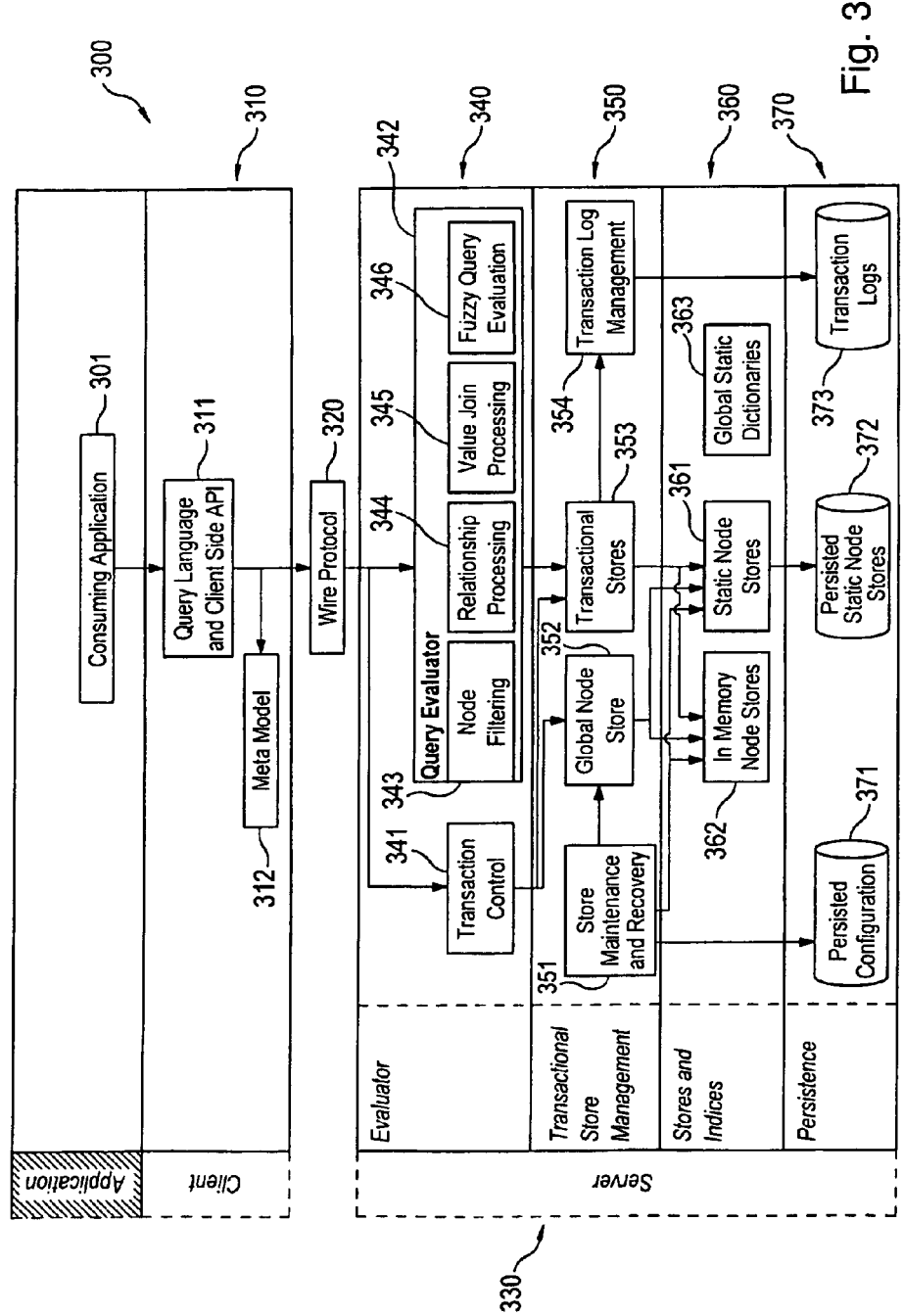
FIG. 3 is a overall view of a system in which the database according to an embodiment of the present invention may be applied.

FIG. 3 is an overall view of a system 300 in which the database according to an embodiment of the present invention can be used. The system 300 comprises in general a client side component 310 that communicates in a transactional manner with a backend server 330 wherein the client side component is used by consuming applications 301.

The client side component 310 exposes a query language and the client side application programming interface (API) 311. The client side component 310 is also aware of the meta data model 312 that is specified by the application 301 and sends its request via a wire protocol 320 to the server 330.

On the server side 330 the evaluator 340 is responsible for the mapping of queries into accessor trees. The evaluator 340 is responsible for execution of projections, queries, updates, inserts and deletes in the context of transactions. In particular, the evaluator 340 comprises a transaction control 341 for controlling the transaction initiated to the server 330. Furthermore, the evaluator 340 comprises a query evaluator 342 having means for node filtering 343, relationship processing 344, value join processing 345 and fuzzy query evaluation 346 which are adapted to interpret the query as to identify the processing to be made during the execution of the query.

The transactional store management 350 handles transactions and concurrency issues and is responsible for store maintenance 351. This includes the global node store 352 that memorizes the global state of the system 300 as a sequence of stores. The sequence of stores reflects the sequential order of operations that constitute the current state of the system 300. Besides that multiple transactional node stores 353 can exist (one for each running transaction). These reflect the transactional state as the order of stores as seen by an individual transaction. The transactional store management 350 may also comprises a transaction log management 354 which is adapted to store and manage logging information of the operations which have been executed in the transaction. Thus, disaster recovery information for restoring the database or particular data stores after a system failure may be provided by the transaction log management 354.

The stores and indices layer 360 is responsible for the internal representation of the data and provides the basic access mechanisms. The main store types are the static node store (SNS) which is a read only structure and the in-memory node store 362. The lifecycle of any chunk of data starts in an IMS 362 and will eventually end up in SNS 361. Parts of the data can exist in multiple versions in SNS 361 and IMS 362 stores. Furthermore, global static dictionaries 363 may be provided which will be described below in more detail.

The persisted state layer 370 reflects the global state of the system 300 on a disk. It consists of a persisted configuration structure 371 that reflects the sequence of Static Node Stores 372 and log files 373 that constitute the current system state.

In the following, data structures and algorithms which may be used in connection with the described embodiments will be described in detail.

The ordered unsigned integer set (OUIS) is a basic data structure (also referred to as an index structure) for ordered sets of integers, in particular ordered sets of unsigned arbitrary sized integer values. The OUIS may be used as the central data structure for the static node stores (SNS) and/or as most common data structure of the embodiments described herein. The indices may heavily depend on this data structure. It is to be noted that the below described data structure is optimized in many ways for the needs of databases such as those according to embodiments of the present invention.

As described above, the static data stores use an index structure which is based on a non-updatable representation of an ordered set of integers according to the principle of compressed inverted indices. In one embodiment of the present invention, the index structure of the static data stores comprises blocks of consecutive integer entries of the ordered set of integers and a search tree. Each of the blocks contains a number of chunks each having a number of integer entries. The number of chunks as well as the number of integer entries is preferably predefined. The number of chunks and the number of integer entries may be set to any value which is suitable for the particular configuration of the database. In the following example, it will be assumed that the number of chunks N is set to 16 and the number of integer entries M is set to 64.

In this example, a new index structure will be generated for a static data store comprising 4096 data entities (i.e., 4096 unique identifiers) during the above describe converting step by performing the following steps. The ordered set of 4096 integers may at first be partitioned (i.e., divided) into 4 blocks per 1024 integers. The number of integers in each of the blocks may be calculated by multiplying the number of chunks N with the number of the integer entries M (i.e., N×M). These blocks may further be partitioned into the number of chunks N.

In a further step, deltas between any two consecutive integer entries in each of the chunks are computed. That is, for example, if a chunk comprises the integer entries 60, 245 and 8821 consecutively, the deltas will be computed to 185 between 60 and 245, and 8576 between 245 and 8821. The computed deltas may then be used to determine the maximum of the deltas which in the above example is 8576. The so determined maximum delta defines the size of the entry which is needed to write the maximum delta in terms of memory space. When assuming that each entry is stored using bitwise fashion having binary values 0 and 1 as usually used in computer systems, then each entry needs at least 14 Bit to store the maximum delta of 8576. This may be determined by considering that 2 to the power of 13 is only 8192 (i.e., 13 Bit), thus smaller than 8576 which means that 13 Bit are not enough to store an entry having a number of 8576. Therefore, the next possibly power is considered as needed size of the entry which is 2 to the power of 14 (i.e., 14 Bit) and with 16384 greater than 8576. However, any fashion other than bitwise fashion may be used to store the maximum entry. The deltas may then be stored in entries of the chunk having the size as determined above, consecutively.

In a further step, the chunks may then be stored consecutively in the block to which the chunks refer, and an offset for each of the chunks and its starting value in the block may be determined and stored in a header of the block.

The blocks generated as mentioned above are stored in a consecutively ordered fashion. In a last step, the search tree is built using the blocks so that the search tree comprises a node for each of the blocks. Each node in the search tree may consist of a value of the first integer entry in the block to which the node refers and a pointer to a position in the index structure where the block starts. The search tree may be built as known in the art and thus its description will be omitted here.

Figure 4:
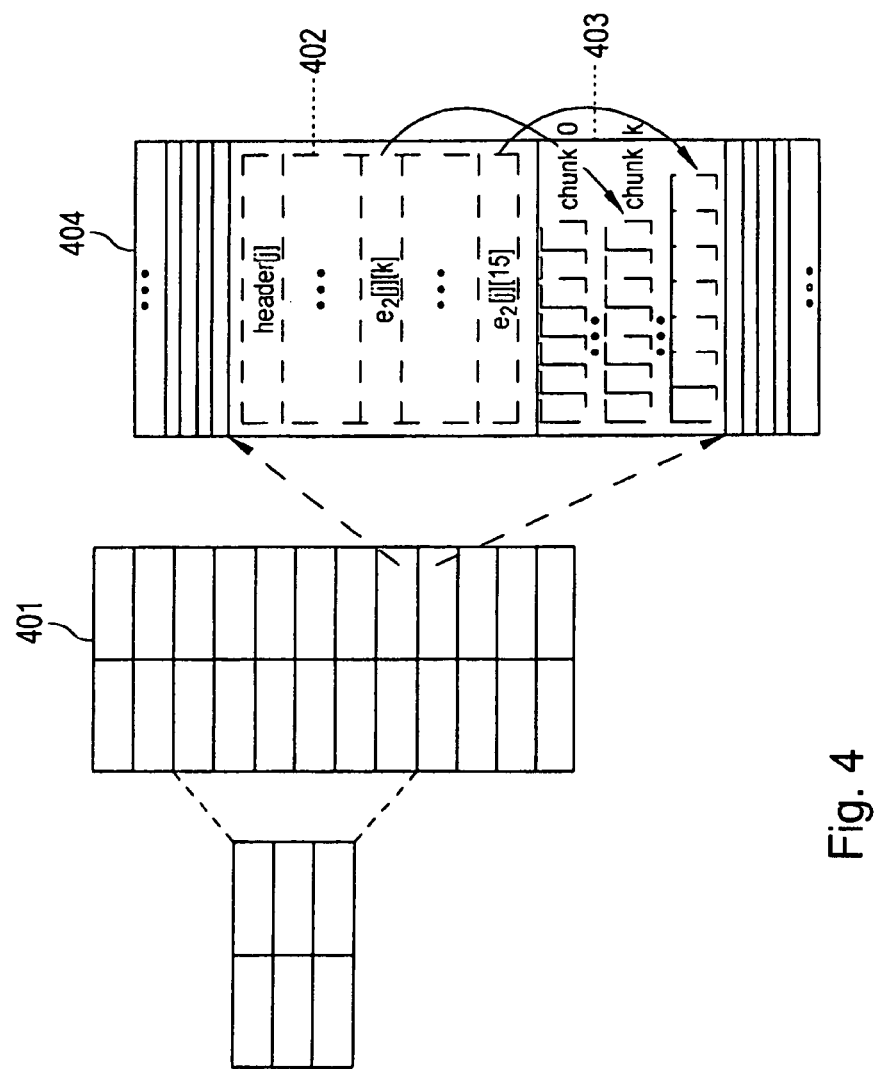
FIGS. 4-6 show an example of the index structure according to an embodiment of the present invention.
Figure 5:
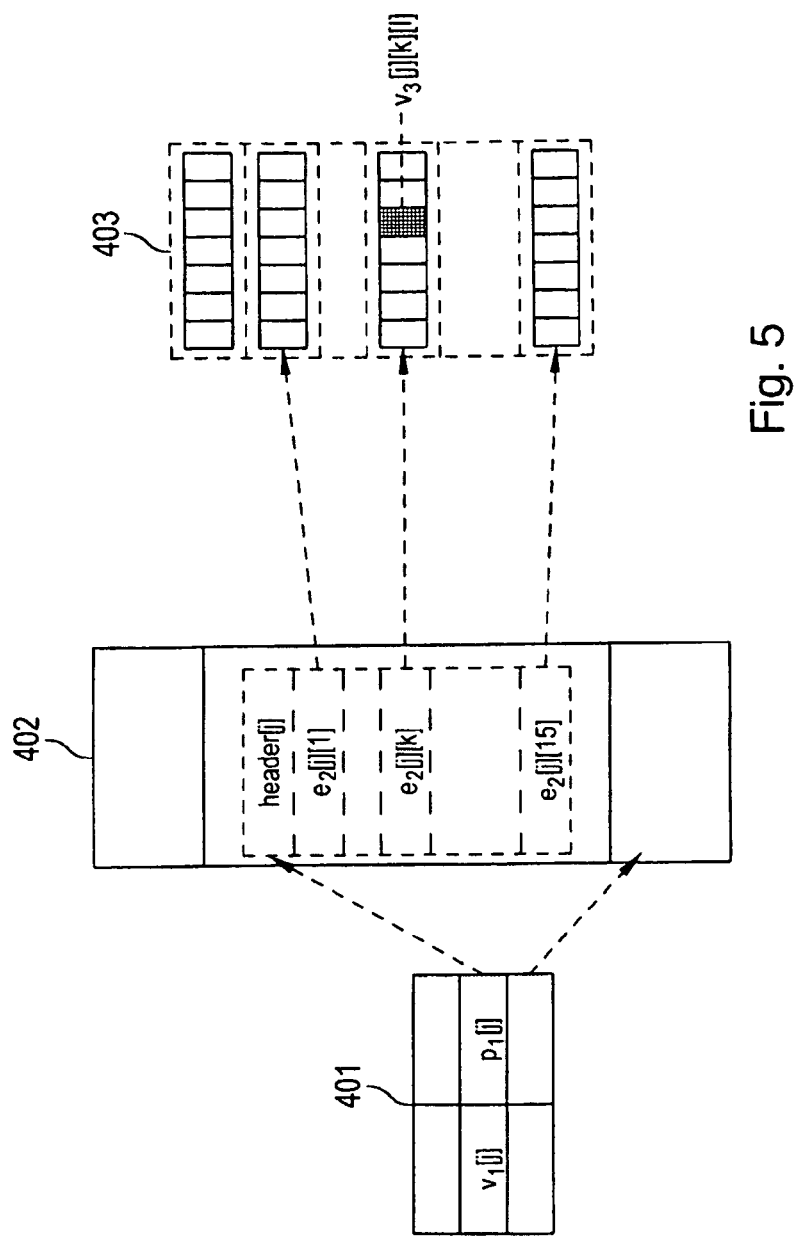

An example of the OUIS will now be described with reference to FIGS. 4-6. The OUIS is a three level structure 401, 402 and 403 as shown in FIG. 4. This ensures that for any set the bulk of the information is stored in the lowest two levels 402 and 403, and that those levels are as compact as possible while providing reasonably efficient random access by index. As will be easily recognized, there is a trade-off here between compacting individual entries using variable length representations and adding the addressing information to allow those entries to be quickly accessed.

Levels 2 402 and 3 403 are folded into a sequential structure 404. The top level 401 of the OUIS contains one entry for every 128 elements in the set. The level 1 401 structure is based on a compact search tree to represent these elements in a form that exploits deep memory hierarchies. The main issues with this structure are supporting a sequential generation model for sets that are too large to fit in memory without requiring significant buffering, and supporting efficient random and sequential access within the structure in the context of deep memory hierarchies, support for arbitrary length integers and the addition of the addressing information to locate the chunk for each element at this level. Standard mechanisms for the sequential generation of cache oblivious binary search trees are applied here, augmented by the addition of the required level 2 402 chunk address information. Blocks in this structure are written as they are filled during the sequential writing of the data.

The OUIS partitions the set into chunks of 128 entries and provides a top level search tree over every 128-th value that also indicates the locations of each corresponding 128 entry (level 2 402) chunk. Each 128 entry chunk is represented as a 15 entry header and 16 corresponding level 3 403 chunks specifying the values lying between corresponding header (or top level and header) entries. The header entries also include an indication of the offset within the large chunk at which the corresponding low level chunk starts. In both the header and the low level chunk the values are relative to the corresponding entry at the next higher level and are represented with constant size entries that support random access.

The representation of each chunk may be bit aligned, built upon a corresponding structure that supports arrays of fixed size entries of any size in bits, starting at any bit location. For example, the value v[i] of entry i in the set may be determined as follows:

for $i\ \%128=0:v[i]=v1[i/128]$ for $i\ \%8=0$ and $i\ \%128\ !=0:v[i]=v1[i/128]+v2[i/128][i\ \%\ 128/8]$ otherwise:

$v[i]=v1[i/128]+v2[i/128][i/8]+v3[i\ \%\ 128][i\ \%128/8][i\ \%1024/8]$ where v1[j] is the value in the top level 401 structure corresponding to index j=i/128, v2[j][k] is the k-th value entry in the j-th level 2 402 chunk, and v3[i][j][k] is the k entry in the level 3 403 chunk i,j. The value v2[j][k] at level 2 402 may be determined by the range of the level 2 402 chunk R[j] determined by the values of level 1 401 and the error e2[j][k] that is stored in the level 2 402 chunk. The value may be calculated in the following way:

$v2[j][k]=k*R/16+e2[j][k]$.

This results in a more compact representation. The maximum number of bits needed for the error is stored in the header of the level 2 402 chunk. The level 3 403 chunks may be byte aligned and fixed size.

An example will be given next to illustrate how space costs are minimized in the OUIS. In this example, it will be assumed that the lowest level 401 chunk contains the values X+20, X+35, X+60, X+90, X+100, X+105, X+107 where the next value in the header is X+120. This lowest level 401 chunk will then use 7 bits (ceiling(log_2(120))) for each entry. The space needed for X does not impact the chunk space and the cost to represent this sequence is 7*7=49 bits. There are Comb(120,7) such values (i.e., a selection of 7 values from a range of 120 possible values). Assuming each is equally likely the number of such values is 120!/(7!*113!). One possible representation of this set would be relative to an enumeration of all such combinations. The space needed to specify such an index would be about 35 bits, but it will be expensive to compute the value for the i-th entry. As the range expands the overhead of the representation relative to this optimal is reduced.

Figure 6:
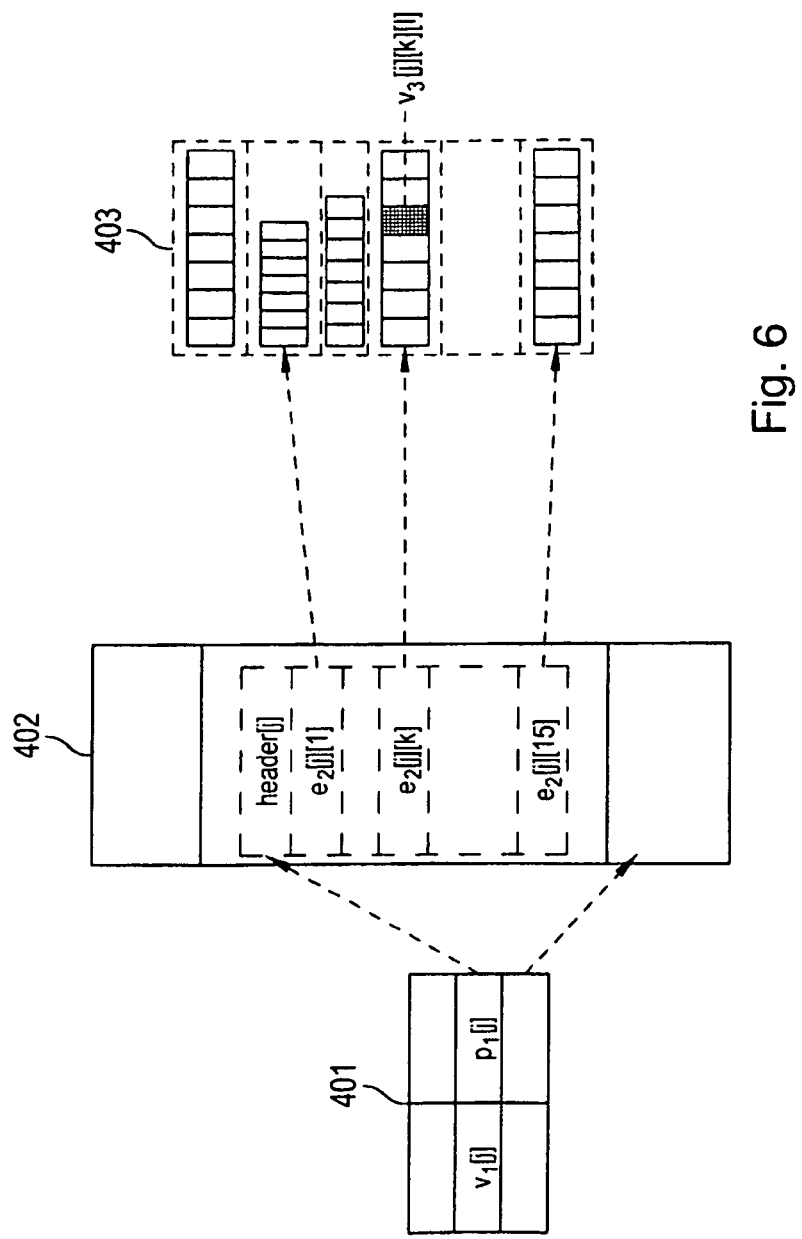

FIG. 6 shows an alternative representation used for postings lists in many full text systems, of a byte aligned variable length delta encoded representation, these values would require 7*8=56 bits and access to the i-th element would require decoding and accumulating all deltas up to i. In this alternative representation, extra structures with so called skip information are often associated with such representations, but these add to the overhead and still do not avoid the overhead for low level random access. The higher level structures in the OUIS to some degree take the place of these so called skip structures, while avoiding the associated overheads, and supporting efficient random access even at the lowest level.

The addressing information in the level 2 402 chunk header, used to locate a 7 entry level 3 403 chunk associated with a specific header entry, may further be minimized by using a prediction mechanism. The prediction may assume that the values in the level 2 402 chunk are uniformly distributed over the level 3 403 chunks. Individual header entries then specify the error relative to this prediction using an encoding that is optimized to minimize the expression of these errors.

For illustration purposes, it will be assumed that the range of values in the level 2 402 chunk is R as determined by the values in the level 1 401 structure, thus the space consumed in the header for each entry value will be ceiling(log_2(R)). Each level 3 403 chunk is then assumed to span a range of R/16 with each entry in those chunks then consuming S=ceiling(log_2(R/16)) bits. The i-th low level chunk is assumed to start at bit i*S from the end of the header and that is the default alignment for the low level chunks.

The OUIS may further provide a second addressing option which is also shown in FIG. 6 that provides efficient representations when the distribution within the 128 entry chunk varies significantly from the uniform assumption. In this event each level 3 403 chunk is encoded with the minimal space determined by its range and each header entry has additional information that encodes the offset from i*S at which the representation of that chunk starts. The big chunk header identifies the range of these offsets, and the individual header entries have additional information that encodes the offset for each entry. This may only be used when the cost of the location encoding is less than the alignment overheads, which only occurs for very skewed distributions.

The generation of the 128 entry chunks of an OUIS requires a buffering of 128 values. This will usually fit in the first level cache of present computer systems and all computations to decide on the structure to use and the encoding of each entry into an output bit stream are very efficient.

According to an embodiment of the present invention, the method may further provide a specific mechanism (hereinafter referred to as GapAccessor) to perform the intersection, union and difference of various data entity sets (identified as sets of corresponding internal IDs that are 64 bit unsigned integers), as well as the selection of subsets of some ordered set as identified by an ordered set of indices within that set. The specific mechanism may support automated optimization of the evaluation of a tree of such operations in conjunction with appropriate indices.

The leaf sets in the tree may be specified via crisp or fuzzy predicates on the attributes of a data entity. In some cases these predicates will be supported by:

(a) Inverted indices whose keys support the identification of the exact set of entities that satisfy the predicate. For example, a predicate "type=person" will generally have inverted indices whose keys are precisely the set of all values of the attribute "type" that occur for any data entity. Recall that the range of the inverted indices is logically the set of internal IDs of entities.

(b) Inverted indices whose keys may be combined to identify the set of entities that match the current predicate. For example, a date field could have an index whose keys correspond to individual days. The set of entities that correspond to a predicate for a specific week will be the union of the sets that correspond to each of the 7 days within that week.

(c) A combination of inverted indices and related subset indices for which the keys of the full index identify some superset of the matching set and the subset indices identify some subset of those sets that correspond to finer grained predicates. For example, an index for a data field whose keys correspond to particular calendar weeks. Individual days within each week may be identified as subsets of the set for the week in which they occur.

(d) Finer grained inverted indices whose range is not just the set of internal IDs, but may include additional information that can be used to support evaluation of predicates that look into more detail about particular values and/or provide information related to computations of a fuzzy score for a matching entity. For example, a predicate on a full text field may be looking for values that have two specific words within close proximity of one another. One type of inverted index that supports such predicates will have keys corresponding to the words and a range that identifies both the entity ID and a position within the value at which the word occurs. These positions can be used to evaluate the proximity condition.

(e) No indices for the predicate so that evaluation requires tests that examine the value of entities to determine if they match the predicate.

An exemplary embodiment of the GapAccessor will now be described in more detail.

The GapAccessors may use the following functions: next to go to the next entity in the OUIS, goToValue which allows to jump to an given entity ID wherein the accessor returns an indication as to whether the entity with the specified ID is in the OUIS computed by the accessor, getIndex to get the index in the set of the current position as modified by the above operations, getValue to get the ID at the current position within the set, and is Done to identify that the OUIS does not contain anymore elements.

The GapAccessor for the inverted index structure as described above may implement the goToValue function in a manner that is at worst logarithmic in cost, but provides a special optimization to be faster in the case that the ID being requested is close to the current ID. This uses an up/down binary search that relies on roughly constant time access by index to the ordered set of entity IDs. Thus, if the set is positioned at index i which has entity ID e and gets a goToValue call with argument g it does:

1. check to see if g is less than e if so reset i to zero,
2. look for the smallest range that could contain g by starting at i+c (c=1) and then move if the value at i is less than g and double c until the value at i+c is greater than g or the end of the set is reached, and
3. do a binary search for g within the index range determined in 2.

In the situation in which almost all entries in some range of the index are visited, the up portion of the search will terminate very quickly with a small range to search. If g is far away, the cost will be at worst two times as expensive as a binary search in the range of the set remaining.

Intersection propagates skipping calls to its inputs in a manner that ensures that the cost for a full evaluation is determined by the most restrictive set and by the overlap of the sets.

As an example, the sets A={1, 2, . . . , 9, 11} and B={10, 11, . . . , 30} will be assumed to be intersected. The intersection will start with the two input accessor pointing to the values A:1 and B:10. A will be told to goToValue(10) and will go to the value 11 as efficiently as possible. It will indicate that this is not a match. The intersection accessor will then get the value 11 from A and tell B to goToValue(11). B will find 11 efficiently and report a match. The caller will then do a goToValue(11+1=12) on the intersection accessor. The intersection will propagate this to A and B. A will return that it is done and the intersection will then indicate that a match was not found and that it is done. In total then there were two calls to the intersection accessor in this example.

Similar automatic optimizations occur for difference and subset operations. Union operations will still need to visit all elements in each set, however, something like A intersect (B union C) where A is small will still be controlled by the size of A with skipping propagated to both B and C.

The intrinsic optimization of the skipping mechanism of the GapAccessors as described above, in conjunction with appropriate indices that will be accessed in monotonically increasing, but potentially non-sequential order, avoids the need for much of the optimization analysis done in many of the known persistence stores.

According to a further embodiment of the present invention, the database may provide support for natural language text. Such natural language text values are assumed to contain the bulk of the information in the application to be supported by the database. In particular, at least one of the plurality of fields of the data entities stored in any of the data stores may comprise a value of the type natural language. Furthermore, the query language and thus each of the operation, especially the query operation, may in a further embodiment support natural language text. Particularly, the query operation may in this embodiment support full text queries.

A key component of providing the capabilities to support queries is a strong built-in natural language capability. A key component in providing this is a compact high speed dictionary for looking up words in the supported languages. Another is a means to map these words, or sequences of words, into some base form (or equivalence class) to be used as the default search key for that sequence and some remainder information that expresses the variations the actual form takes in the text.

For example, in the sentence "The mailman was bitten by the dog." the word sequence "was bitten" together forms the past perfect conjugation of the verb "to bite". Further analysis of the sentence could reveal that this occurrence could be considered to be an example of an "attack". The present embodiment may provide means to have this sentence characterized as a SVO (i.e., subject, verb, object) triple consisting of (dog/the,attack/bite/pastperfect/passive,mailman/the/Cap), and potentially even a further analysis that could identify which dog and which mailman if those were in fact entities known to the database. Furthermore, the present embodiment may provide the data structures to express this information, and efficiently exploit it at query time when the analysis capabilities are provided. High speed tokenization of Unicode text, high speed and compact language specific dictionaries, and high speed but simple dictionary based stemming capabilities may additionally be supported by the present embodiment.

The present embodiment may therefore use a trivial tokenization algorithm that is actually merged with an encoding to translate each token in the text into a pair of unsigned 64 bit values (U8s). One element of the pair encodes the case and accent insensitive form of the word, for languages that support those notions and where such information is regarded as irrelevant for default search purposes. The second encodes the actual case and accent information so that the database can still provide case and/or accent sensitive searching if desired. The purpose of this encoding is to provide a form that can be rapidly looked up in per language static dictionaries. As the encoding of some natural language words, or other tokens in the text, may not fit into a single U8 subsequent stages in the processing of the tokenized form are responsible for handling sequences of U8 that have been created due to the size limitations of the encoding output.

For example, for text that uses the Latin alphabet the encoding for the base uses 5 bits per character to allow for the 26 base letters, and special ones such as the German sharp S. Thus, 12 characters can be encoded into a single U8. The encoding of the case and accent information for these languages is lossless to ensure that if this form were used for storage, rather than just indexing, the exact input could be reconstructed. This can be complicated to some degree by the redundancy in Unicode that allows many accents characters to have as many as 3 different Unicode encodings.

As noted above, the present embodiment may further comprise a per language static dictionary. These dictionaries are fairly small. According to one embodiment, the dictionaries may be in-memory structures. These dictionaries take as inputs the words in the encoded U8s produced by the tokenization. The handling for non-word tokens, and word tokens whose encoding does not fit into a single U8, are discussed below.

The distribution of the occurrences of the words in a natural language may generally follow a distribution according to Zipfs law (i.e. the relative frequency of the i-th most frequent item is roughly 1/i times the frequency of the most frequent). For example, in normal English text this leads to a distribution in which the 100 most frequent words account for about 50% of all word occurrences (these are basically function words such as articles and prepositions), the most frequent 10000 account for about 95%, and there is a long tail of other "words" (often misspelling or domain specific words). When assuming that a dictionary such as The Oxford English dictionary contains approximately 120000 words, this characteristic may be exploited by the present embodiment to build a 3 level structure:
1. a 128 array of U8s,
2. a 16384 array of U8s, and
3. an array of U8s large enough to contain all of the words.

The dictionary may be built by adding words in descending frequency order. All dictionary words are tokenized as noted above. For example, each U8 produced may be hashed into a number in the range [0,16384]. The top 7 bits of this hash are then extracted. If the entry in array 1 at this index is empty the current value is added there. If not the full value of the hash is used as an index into array 2. If that entry is empty the value is added there. If not the entry is added to array 3. After all entries have been added array 3 is sorted so that simple binary searches can be applied to it. One option that could be done is to reduce the space consumed by array 3 by using the OUIS structure, but as the total space is relatively small compared to the usual main memories this is not deemed necessary in general.

It is to be noted that in the above described embodiment most of the highest frequency elements will be in array 1, and the next higher in array 2. Array 1 may therefore be small enough to fit easily into the level 1 (L1) cache (requiring only a few CPU cycles to access) on most systems. Array 2 similarly will fit into most level 2 (L2) caches that required something on the order of 10 cycles to access. Binary search is only needed for the array 3, and this will only generally be needed for 3% of all words. Thus, this dictionary provides on average very high speed translation of a stream of input words into dictionary indices with the property that the smallest indices correspond on average to the highest frequency words.

For words whose encoding does not fit into a single U8 (e.g., in the English dictionary there are fewer than 12000 such words), each U8 chunk is added to the base dictionary, where the encodings are augmented to indicate that these are parts of a multiple entry word. The indices of these entries in the base dictionary are then concatenated to form new U8s, and that set is sorted and stored in a simple U8 array. Again binary search can be applied to lookup such sequences in this array. Indices in this array are then added to the last index in the base array to allow the database to quickly identify which dictionary to use for a given word.

Furthermore, non-word tokens, or word tokens that do not occur in the static dictionary for the language are split into chunks with flags added to identify whether they are the first chunk, a middle chunk or a final chunk. The size of these chunks may be selected to ensure that they can be used directly as keys in the index structures described below. As there may be some word tokens that are not in the static dictionary, but still are very frequent within a particular deployment of the present invention, an embodiment may exploit the general high frequency phrase handling mechanism, described below, to ensure that these can still be looked up efficiently.

In the event that an input word is in the static word dictionary the database according to the present embodiment may use the index produced by the dictionary to lookup in a corresponding array the index of the stemmed form of that word and an index that identifies the category of the variant of that stemmed form (e.g. the past participle of a verb). On building these structures, the database may ensure that the stems for all words exist in the base word dictionary so that the indices into the base dictionary are used to represent the stem.

The stemming dictionary according to an embodiment may perform some context sensitive processing for a word. This processing may include checking to see if the previous word is one of the standard auxiliary verbs associated with the various verb conjugations.

With respect to the above, the database according to one embodiment may comprise a dictionary including a mapping from words to wordindices. That is, if the dictionary is, for example, an English text dictionary and comprises the words "database" and "computer" mapped to wordindices 10 and 123, respectively, each of the above words found in a natural language text value may be mapped to the respective wordindex.

If such a dictionary is present in the database, a new index structure of the new static data store to be built during the conversion of selected data stores may preferably be based on a field of the data entities comprising natural language text values.

In this case the step of building the new index structure may further comprise the following steps. At first, if a word of the natural language text value is equal or at least similar to a word of the dictionary, the word of the natural language text value is mapped to the wordindex of the dictionary. Using the above example, if the natural language text value comprises the word "computer", this word is mapped to wordindex10. Then, a pair comprising the wordindex and an identifier of a data entity of a merged data entity is mapped to an integer of the ordered set of integers, if the new static data store contains the data entity and the field containing the word or a form of the word.

The components as shown in FIG. 3 will now be described in more detail.

A client application 301 may use an API and a query language 311 both provided by an embodiment to perform its transactional operations with one or more backend server 330 instances. The operations include transactional ones such as starting, committing and aborting along with a sync operation that ensures that subsequent query operations within the transaction will see the updates made during the transaction.

The query language 311 may support the definition of sets or forests of entities using a regular path expression style. The language 311 may further provide means to express both crisp and fuzzy full predicates. There exist specific predicates that are aware of natural language and have knowledge about language specifics like stemming. The API 311 provides means within the language and with parameterization mechanisms to control the manner in which fuzzy predicates can be combined. The API 311 provides the means to specify the attributes to be projected for each set. There may be according to another embodiment no means to specify computed projection values over multiple entities as is done in relational projections within the known SQL statement SELECT. However, much of the need for such functionality may be emulated by exploiting the flexible data model 312 to compute such values at update time as new named attributes assigned to the entities.

The data model 312 will now be described in more detail.

It is assumed that relationships provided in the embodiments described herein may have attributes and be n-ary, and entity or relationship attributes can potentially be multi-valued and of heterogeneous type.

The flexible data model 312 which can be seen as a less restrictive version of Chen's original Entity-Relationship proposal may be provided according to an embodiment. Chen identified a logical partition between entities and relationships, and sets of entities of the same type, but all entities of the same type had the same attributes (a carryover from the rigidity of the relational model) and no mechanism is provided to deal with any form of entity type relationship such as inheritance. The above flexible data model 312 consists of a set of entities and a set of relationships between those entities. Both entities and relationships can have arbitrary sets of attributes associated with them. Relationships are named tuples of roles where individual entities occur in those roles. For many applications the most common relationships would be unattributed binary ones. However, the data model 312 allows more than two entities to be related by a relationship and allows those relationships to have attributes which can influence the behaviour of the database.

As will be recognized by the skilled person, the above describes the high level data model of entities and relationships which is provided in the database according to the above embodiments. In a database dealing with large textual data that can include such entities as emails, word processing documents and HTML or XML documents, the embodiments of the present invention also have a notion of attributed tree structured textual values. A full text value can contain sections that occur at multiple levels, sections can contain sections (at lower levels) or paragraphs that can be of either body or heading type, and paragraphs contains sentences that are sequences of words or non-word tokens. Sequences of words or non-word tokens can be highlighted. This structure is exploited to refine its match probabilities for fuzzy predicates as will be discussed below. In that discussion these various levels (sections, paragraphs, sentences) are referred to as segments.

Following, the query language 311 provided in embodiments of the present invention will be discussed in further details.

In text dominated applications, for which the embodiments of the present invention are intended, the majority of the data consists of various representations of natural language information, such as word processing documents, emails, blogs, wikis, instant messaging text and audio files of spoken discourse. In such a domain the support for both crisp and fuzzy predicates is critical.

For example, consider two distinct natural language passages that contain the two sentences: "The Doberman attacked the mailman." and "The mailman was bitten by the dog.". A user who issued the query "dog attacks" would probably consider both passages to be "relevant".

Further, that predicate may be part of a more complex query such as "insurance claims from summer of 2006 concerning dog attacks handled by someone reporting directly or indirectly to John Doe". Such a query has crisp components: the type of entity is an insurance claim, the identity of the individual who handled the claim as expressed by a recursive relationship (although this may also be fuzzy to some degree as one may consider people closer to John Doe in the reporting chain to be more relevant); as well as fuzzy components: the "dog attacks" noted above and "summer of 2006" (which would almost definitely include June through August of 2006, but how many other months should be considered, and should the relevance of the match decrease as one gets nearer to spring or fall).

Further embodiments may specify a query model that supports a range of crisp to fuzzy query capabilities over the data model specified above in contrast to the concepts known in the art. The fundamental model is one of traversing relationships and filtering or assigning match scores for sets of entities. This may be handled by a model of regular filter path expressions and fuzzy and natural language predicates as primary components.

Regular filter path expressions may combine filters and paths in a form similar to regular expressions. They may be composed of simple path expressions, filters and symbols that specify a bound or unbound number of repetitions of a sub expression similar to regular expressions as described hereinafter.

Basic filter expressions may be Boolean combinations of the simple built-in predicates (that include a rich set of full text tests), specific to a particular primitive data type, that test a specified attribute (or set of attributes), of a particular entity. Filters may be indicated with brackets in the query language and have forms like:

[name='Mary']
[name='Mary' and age<18]

Filters can also be applied to the attributes of relationships. For example, the "HandledBy" relationship would likely have a date attribute indicating when the claim was processed, and the "ReportsTo" relationship likely would have a date interval attribute that would indicate the period when that reporting relationship was valid. The "summer of 2006" condition would then be applied as a filter on that date.

Path expressions can be seen as edges from entities via an incoming role of a relationship and from there via an outgoing role to entities. For binary relationships the name of the relationship may be used as short form to navigate along the in role to the relationship and then via out role to the entities. Simple path expressions may also be applied to sets. The result of such an application will be the set of all entities that are reached from the input set along the path. Path expressions may be combined.

Assuming a domain of persons and edges that stand for kinship. For example, the query [firstname='Mary' and lastname='Stuart']/child would result in the set of all children of persons with first name 'Mary' and last name 'Stuart'. The navigation along the child relationship is indicated with a '/'.

The traversal may be specified to occur some minimum or maximum (potentially unlimited) number of times for transitive relationships. For example [firstname='Mary' and lastname='Stuart']/child+ is a query that returns all descendants of 'Mary Stuart' while [firstname='Mary' and lastname='Stuart']/child* results in all descendants and 'Mary Stuart' herself. '*' indicates an arbitrary positive number of traversals while '+' indicates one or more traversals along the edge.

As a more complex example typical for applications that process documents the query "everything that is authored by somebody of whom 'John Doe' is direct or indirect boss" might then be expressed in the query language as [Name='John Doe']/bossOf+/authorOf.

The type of the elements in the result set might depend on the type of the relation authorOf. If authorOf relates to documents and mails are a sub set of documents then the query can be easily restricted to only return mails by [Name='John Doe']/bossOf+/authorOf[Type=Mail].

Basic fuzzy predicates that specify how scores should be computed to determine the probability that a given condition matches a particular attribute or set of attributes. This can weight matches in different attributes more or less strongly than others. For example, a match of the condition "dog attacks" in a title field could be specified to carry more weight than a match in a document body.

For full text fuzzy predicates the described embodiment may either use traditional full value statistical score calculations or segment level calculations that exploit the internal structure (an attributed tree of sections, paragraphs, sentences) detected for such values. Further, the embodiments may support a representation of sentence information so as to allow that the sequences "Doberman attacked" and "was bitten by the dog" are potentially both treated as matches for the phrase "dog attacks".

In the query language 311 the weighting may be specified with a weight modifier. For example, the query [mailBody contains/weight=10 'dog attacks postman' OR/weight=1 'Christmas'] will rank dog attacks to postmen high with a bias for Christmas. Mails with dog attacks that have no match for Christmas will have lower score than mails that refer to Christmas events without any occurrence of something similar to dog attack.

The evaluator 340 of the server 330 will now be described in more detail.

In the event that some new sets have been defined since the last value retrieval the API implementation collects all of the query specification that have been defined since that point and makes a request to server components as shown in FIG. 3 to obtain initial chunks produced by each such definition. These chunks are cached in the client 300, and as long as value requests can be satisfied from the cache no further communication to the server 330 is required. Such communications will only be performed if the chunks in the cache are exhausted or new sets are specified and values from iterators on those sets are requested.

The evaluator 340 is responsible for processing each user request. It has a transaction control component 341 that is responsible to do all operations within the correct transaction context. The evaluator 340 may further contain a node filtering component 343 that is responsible for translating filter expressions from the query into trees of GapAccessors. The relationship processing component 344 of the evaluator 340 translates relational traversals and conditions into operator trees.

Node filtering is essentially the translation of filter predicates into trees of GapAccessors. A GapAccessor is an essential data structure that is optimized for access either sequential or with gaps.

Figure 7:
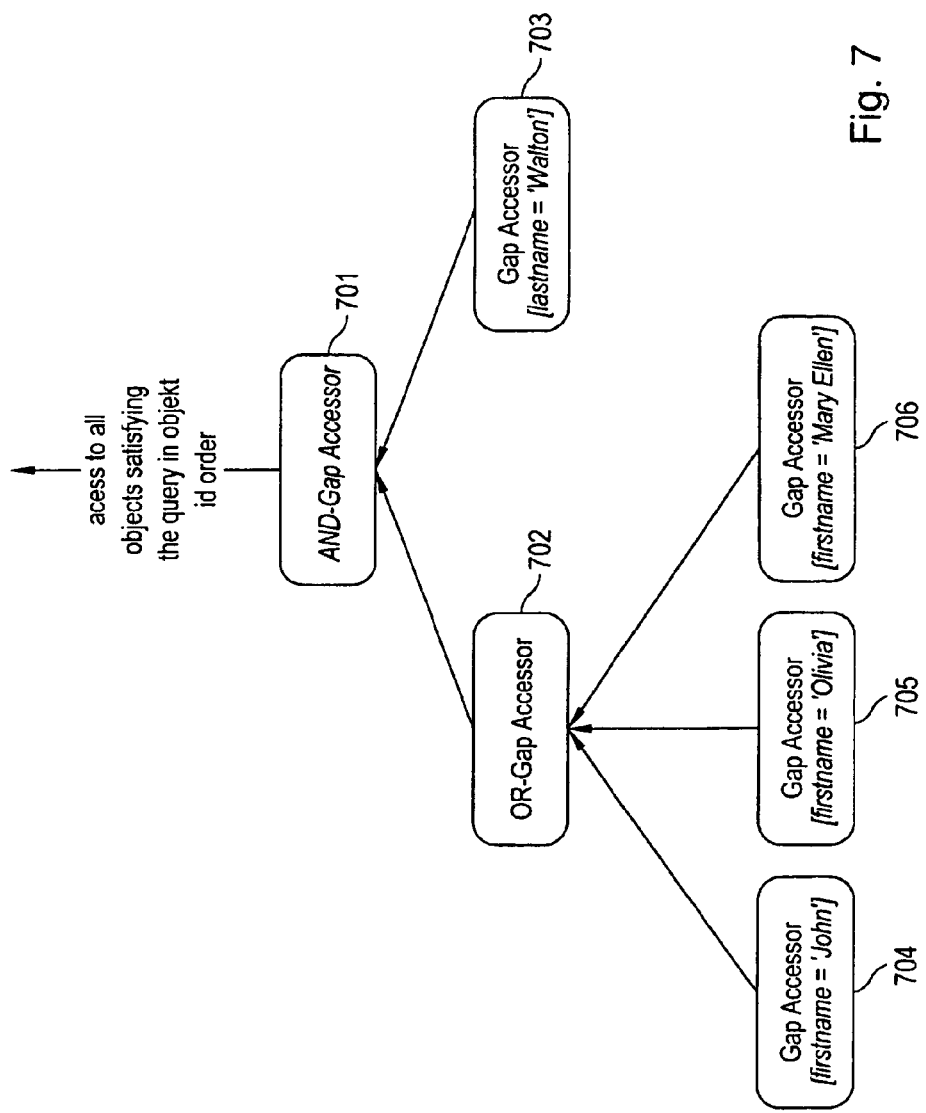
FIG. 7 illustrates an tree of GapAccessors for a query according to an embodiment of the present invention.

As an example, assume a query of the form: [(firstname='John' or firstname='Olivia' or firstname='Mary Ellen') and lastname='Walton'] will be translated into a tree of GapAccessors as shown in FIG. 7.

The above query will at first be translated in an AND GapAccessor 701 which takes the results of an OR GapAccessor 702 and a GapAccessor for [lastname='Walton'] 703 as inputs. The OR GapAccessor takes the results of the GapAccessor for [firstname='John'], the GapAccessor for [firstname='Olivia'] and the GapAccessor for [firstname='Mary Ellen'] respectively as inputs. The above query is executed beginning with GapAccessors 704, 705 and 706. When the AND GapAccessor 701 has been executed the resulting identifiers satisfy the above query.

A GapAccessor for a predicate will be translated to either an index (either directly or to a projection index) or into a "scan and test" accessor.

A n-ary OR GapAccessor may be maintained by a heap data structure with the current position of the multi or accessor at the top of the heap. A goto next on the heap will advance the accessor of the top element and then rebalance the heap structure. The new element at the top will then be the next element for the iteration. Similar optimizations will exist for AND operators.

Figure 8A:
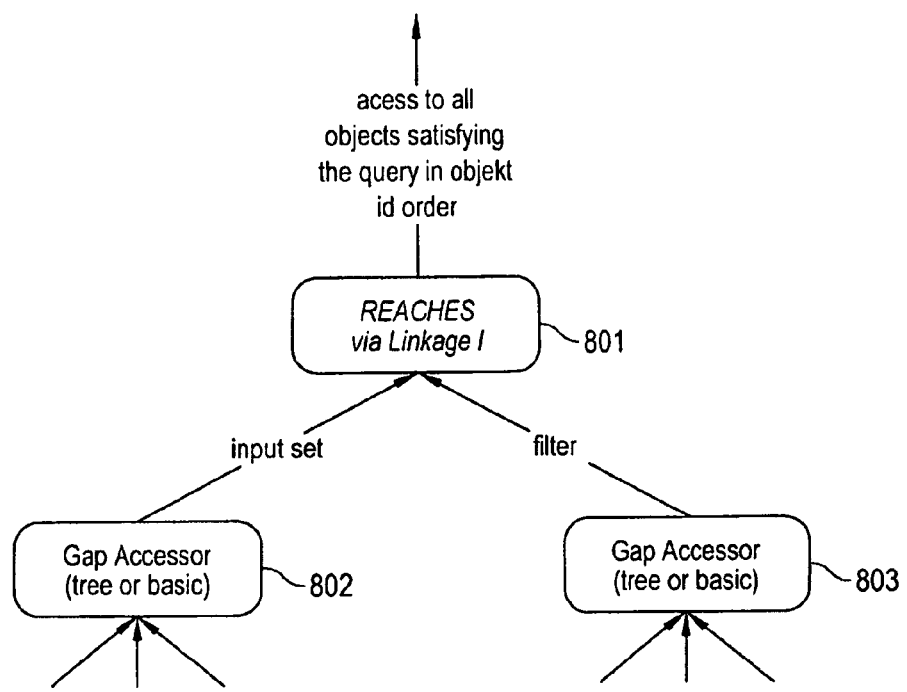
FIGS. 8A and 8B illustrate the reaches and navigate constructs according to an embodiment of the present invention.
Figure 8B:
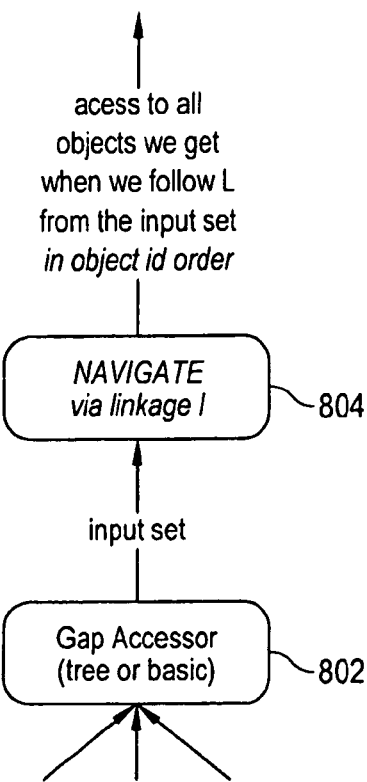

The two main operators are shown in FIGS. 8A and 8B which are designated as reaches 801 and navigate 804. Both reaches 801 and navigate 804 may take a GapAccessor 802 as an input set and a linkage (not shown) as parameter. Furthermore, reaches 801 may take a GapAccessor 803 as a filter. Both GapAccessors 802 and 803 may be a tree of GapAccessors or a single basic GapAccessor. The recursive structure of linkage is explained below, in the simplest case a linkage is a binary relation. This corresponds to the tree inputSet.reaches (I, filterSet) as shown in FIG. 8A wherein the filter set of the 'reaches via Linkage I' operator and the output of the 'navigate via L' operator may be sorted according to one embodiment.

Figure 9:
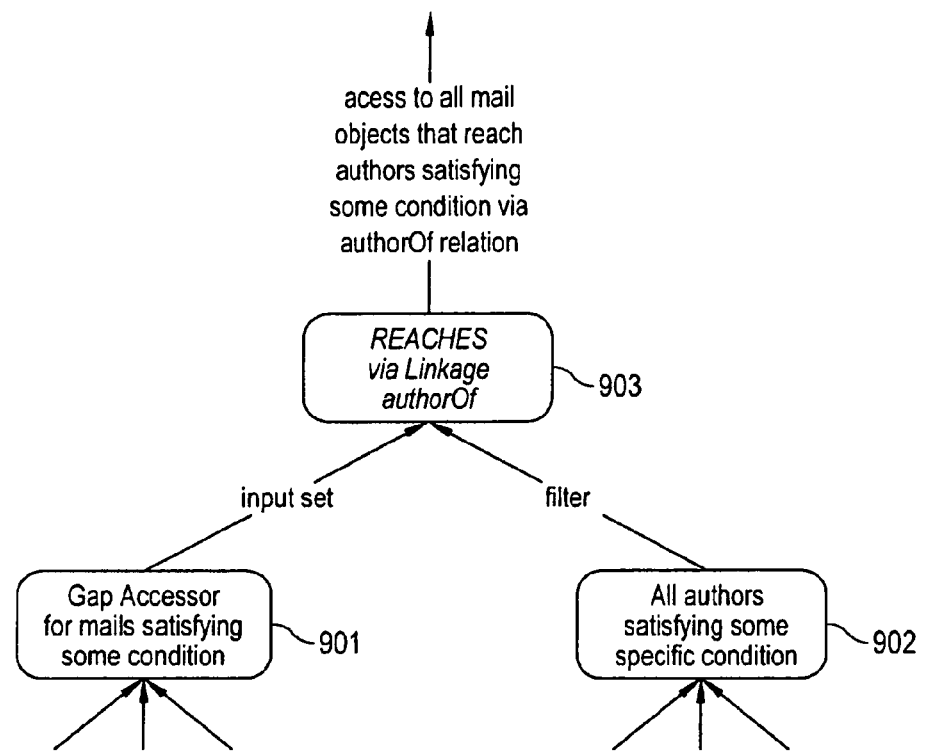
FIG. 9 illustrates an example of the reaches construct according to an embodiment of the present invention.

For example as shown in FIG. 9, a query 903 in a document related context could be the set of all mails satisfying some condition (input set) 901 whose author satisfies some condition (filter) 902.

The transaction store management 350 will now be described in further details.

Each new transaction starts with the set of data stores that reflect the current global state and a new in-memory data store that reflects the updates that occur within this transaction. As described above, the new in-memory data store may be generated at the beginning of the new transaction or when an update, insert or delete operation is to be executed next. Merges, and other transaction commits, occur without affecting this set for the in process transaction. The state view for this transaction is always then the ordered sequence of committed data stores that existed at the time the transaction was started and the updates that occur within the transaction. These updates are not visible to any other transaction until this transaction commits.

Figure 10:
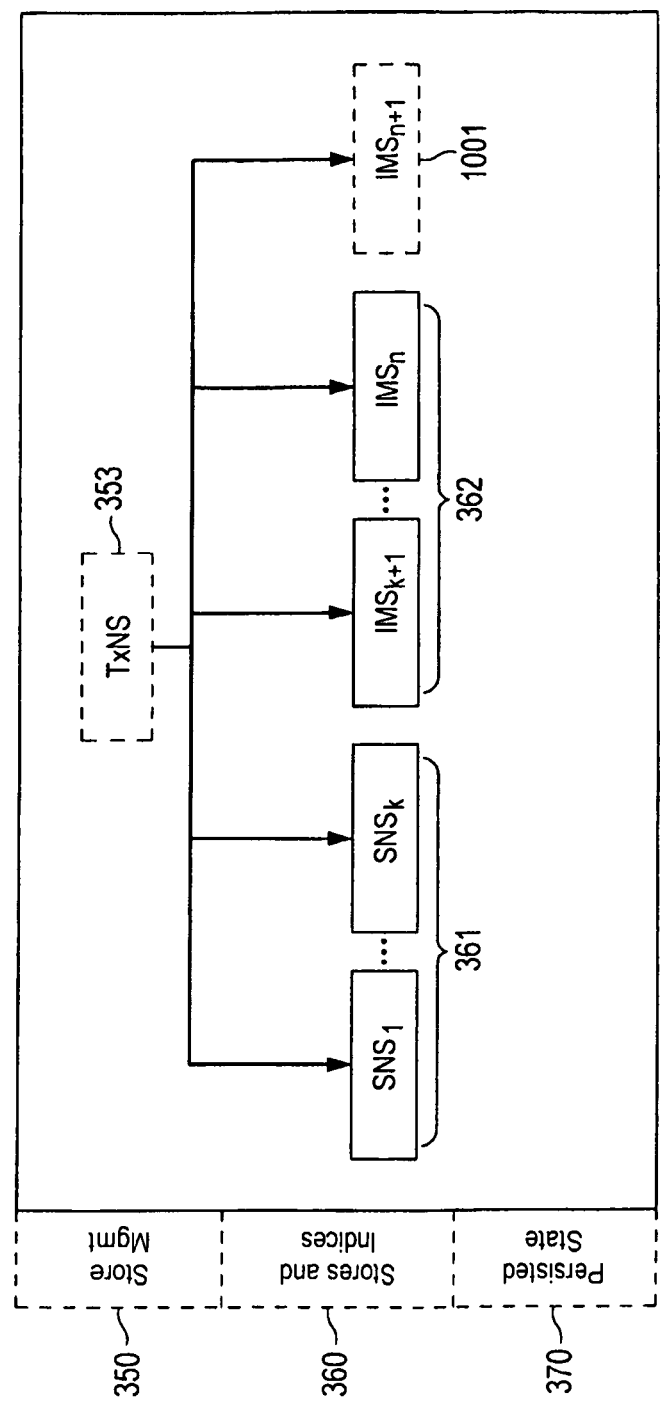
FIG. 10 shows an ordered set of data stores being present in the database according to an embodiment of the present invention.

As shown in FIG. 10, at a specific time the transactional data stores 353 of the transactional store management 350 comprises a number of n data stores. A number of k of those n data stores are static node stores 361 and the rest of the data stores are still in-memory node stores 362. The index of these stores may reflect the order in which these data stores were committed.

According to one embodiment, one data store may reflect multiple transactions as results of some merge activity (this is described in detail below). The transaction keeps a structure that we call transactional node store (TxNS) 353 that memorizes the data stores that are part of the transaction. Any other transactions will not affect the global state of all nodes visible from queries in this transaction as all of the data stores are either read only such as static data stores $SNS_1, \ldots, SNS_k$ 361 or already finalized IMSes 362 that are finalized when preceding transactions committed. The transaction may create a new in-memory node store $IMS_{n+1}$ 1001 as shown in FIG. 10 where the changes of this transaction are reflected.

When a transaction is committed the information in the associated in-memory node store is written to the transaction log 354. This is written in a form that reflects the net effect on the system state of that transaction rather than as some sequence of updates. The committed state of the system is maintained as the union of a special "configuration" file that identifies the set of committed read only store files and the transaction log. The cost of a transaction commit (or prepare in the case of two-phase commit support for distributed transactions) is then an append of the in-memory transaction update information to the transaction log. In case of a system crash a recovery manager restores the state of the system from the on disk information of the configuration file, the SNSes and the log files.

The interface provides a means for a client to explicitly request a write lock on individual entities. While this is not an adequate control mechanism to support state based updates such as required for accounting type applications, the mechanism is expected to be sufficient. For use cases where this assumption turns out to be invalid a means to explicitly obtain and release entity level shared read locks may be added. An in-memory version of the committed store is maintained for new transactions. The state as a sequence of read-only stores eliminates a need to reflect the transaction modifications in a corresponding set of updatable page changes and thus leads to a system behaviour with significantly less disk page accesses for index and value updates compared to traditional systems (RDBMS).

Background processes that make the index and value representation more compact are the main mechanism of the store maintenance component 351. The background processes merge read only data stores, clean up data stores that are no longer needed by any transaction and prune the transaction log. Detailed description of each of these is provided below. A special configuration file may be maintained that identifies the current sequence of committed stores. This may be a small file that just lists the names and sizes of the files that contain these stores.

The state of individual entities can be updated within a transaction. The state visible to that transaction is the state that existed at the beginning of the transaction, modified by any changes that have occurred within the transaction. If an update of an existing entity occurs within a transaction the transaction update description maintains a specification of both the entity that was updated and the attribute(s) that were affected. Any query done within the transaction will see the state of the entity masked by the changes to individual attributes. At some point in the merge process (converting step) the entire reflected state of an entity, that is updated within a transaction, will be copied, from the older store that maintains that state, into the new merged store with the modifications made in the transaction applied.

The transactional store management 351 is responsible for the execution of queries, inserts and updates in the correct transactional context. For queries this means to build an accessor tree over the valid indices in the stores in the transactional context. This context is reflected by the set of static node stores 361 that correspond to the persisted state at the time the transaction started identified by the global node store 352 and the updates made within a transaction as reflected in the in-memory node store 362 specific to the transaction that is created when the transaction starts.

For each IMS 362 a corresponding log file guarantees that the effects of a transaction are not lost in the case of a system shutdown. A recovery manager 351 will then restart from the information in the persisted files which are the config file 371 that holds the information which data stores and log files are part of the current state and the so referenced SNS 372 and the log files 373 themselves.

The present embodiment may also provide a mask mechanism that masks old versions of a value so that the accessors only see valid values within the current transaction context. Essentially the mask mechanism is based on an accessor type that iterates only over up to date values of a field and masks out values that have been modified in data stores that were newer.

The mechanism as described here would soon result in a fragmented state with lots of stores. To avoid this fragmentation a store maintenance mechanism 351 which is described below is in place.

As long as there are appropriate index structures associated with the predicates in the query the GapAccessor interfaces provide a means to evaluate the query without a need for the optimization process required for typical relational systems. As the server 330 builds and maintains indices appropriate for typical predicates as described below this capability of the GapAccessors is generally satisfied.

Figure 11:
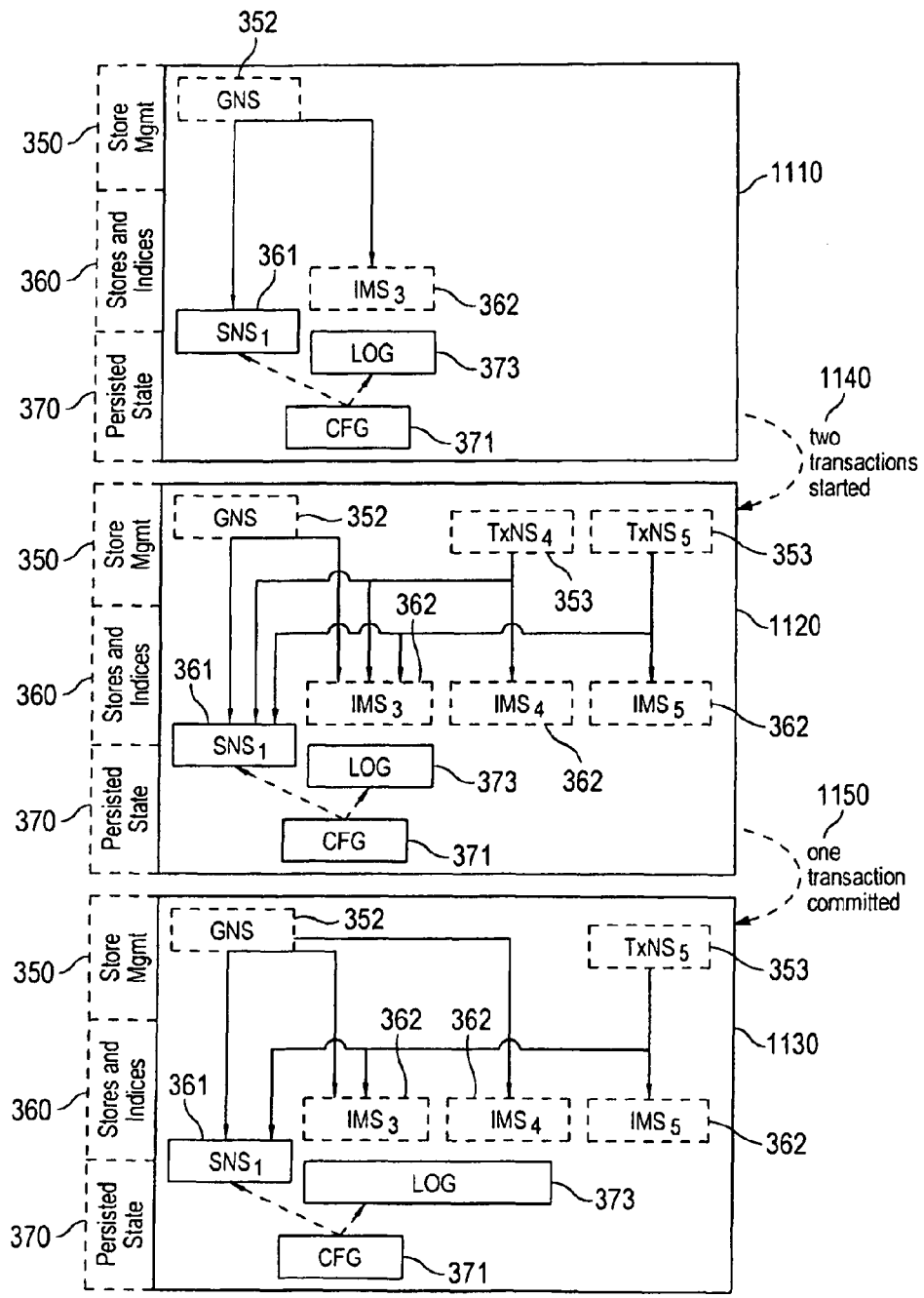
FIG. 11 shows an exemplary sequence of transactions according to an embodiment of the present invention.

Referring to FIG. 11, a sequence of transactions performed on the database according to the embodiments as described herein will now be described.

Each of the states 1110, 1120, and 1130 of FIG. 11 shows its configuration of the storage management 350, the stores and indices 360, and the persisted state 370. At the beginning, the database comprises in state 1110 a configuration file 371, a first static node store $SNS_1$ 361 and a transactional log file 373 both designated in the configuration file 371. Furthermore, state 1110 comprises global node state 352 referring to the $SNS_1$ 361 and an in-memory node store 362 of a committed transaction.

When two transactions has been started (shown by transition 1140) from state 1110, the database results in state 1120 wherein additionally to the above described configuration in state 1110 the following is present. For each of the transactions, a transactional store 353 named $T \times NS_4$ and $T \times NS_5$ is created. The transactional store $T \times NS_4$ refers to each of the stores present in the global state 352, namely to static node store $SNS_1$ and to in-memory node store $IMS_3$, at the time when the transaction has been started. Furthermore, a new in-memory node store $IMS_4$ 362 is created for the transaction and referred to in $T \times NS_4$ 353. The transactional store $T \times NS_5$ 353 has the same configuration, but refers to $IMS_5$ 362 as the in-memory node store for the other transaction, As one of the transaction is committed (shown by transition 1150), the database will be configured as shown with state 1130. The transactional store $T \times NS_4$ 353 of the transaction is deleted and the in-memory node store $IMS_4$ 362 of the transaction is added as newest data store to the global node store 352. Additionally, transaction information about the committed transaction is stored in the transactional log file 373.

Generally, it is shown that a new transaction creates a new IMS 362 that is part of the transactional node store 353 associated with a transactional context. This newly created IMS 362 will reflect all insertions and modifications that are done within the transaction context. This means that the sequence of stores can contain different versions of objects or even attribute values. With this concept the complete system can support transactional inserts and updates based on read only store structures (SNS). When transactions are committed these data stores are added to the global context of the global node store (GNS) 352 and thus a repeatable read isolation level is supported.

The recovery component as included in the store maintenance and recovery 351 of FIG. 3 will now be described with reference to FIG. 12.

Figure 12:
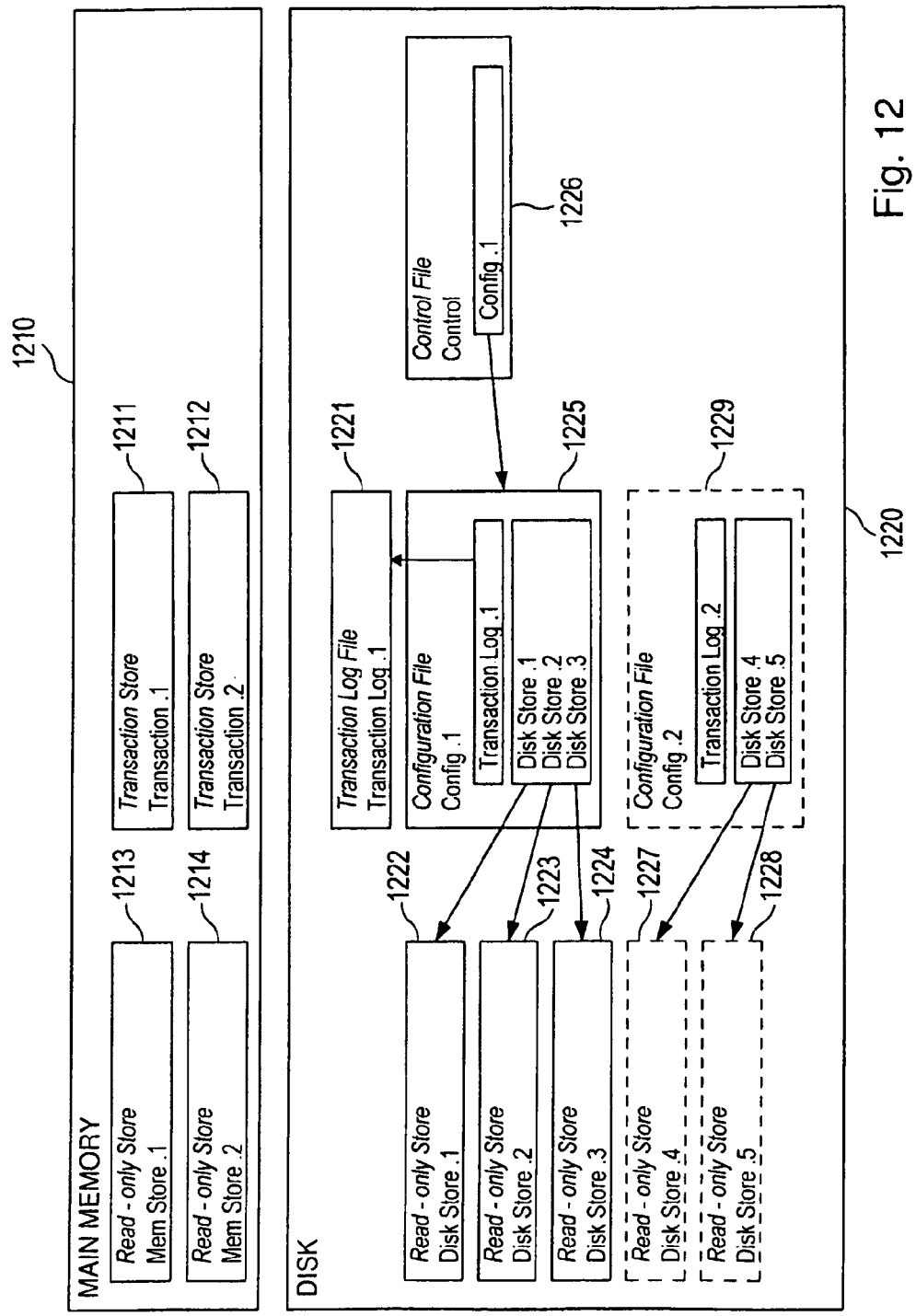
FIG. 12 illustrates a concurrency mechanism according to an embodiment of the present invention.

FIG. 12 shows the state of the main memory 1210 and the disk 1220 of a database according to an embodiment at a specific point in time.

The transaction stores named Transaction.1 1211 and Transaction.2 1212 are modifiable data stores (IMS) for transactions which are currently being performed by the database, thus being present in the main memory 1210. These transaction stores 1211 and 1212 are writable only for the corresponding transaction for which the transaction store has been created. Furthermore, modifiable data stores (IMS) of previously committed transactions are also present in the main memory 1210. These modifiable data stores, named MemStore.1 1213 and MemStore.2 1214, are read-only stores. According to an embodiment, the modifiable data stores in the main memory will be stored on the disk 1220 when a predefined threshold value set in the database is reached or when the modifiable data stores are merged with other modifiable data stores within the main memory 1210. However, to prevent lost of data in case of any database failure, data of the modifiable data stores have also been stored in a transaction log file 1221 on the disk 1220 to ensure the possibility of disaster recovery. The disk 1220 further comprises currently used static node stores (SNS) named DiskStore.1 1222, DiskStore.2 1223, and DiskStore.3 1224 which may be the result of a previously performed merge operation, a current configuration file Config.1 1225, and a control file 1226. The configuration file 1225 comprises the ordered set of all static node stores and the name of the currently used transaction log file 1221. The control file 1226 points to the currently used configuration file 1225. Thus, the content of the control file 1226 needs only to be change to switch to a further—newer—configuration of the database. For instance, if the disk 1220 comprises two additional static node stores DiskStore.4 1227 and DiskStore.5 1228 which may be new static node stores currently built by a merge operation and therefore, currently not active, and a new configuration file Config.2 1229, the configuration of the database may easily be switched to the new configuration file Config.2 1229 after the merge operation has been successfully finished by pointing the control file 1226 to the new configuration file 1229.

As shown in FIG. 12, when a new data store is appended to the sequence or a merge process is completed a new configuration file is created that specifies the new sequence of data stores that specify the bulk of the system state. An additional small file may be used to simply name the current configuration file. This file may be modified in an atomic operation to ensure that it always identifies a valid configuration. The rest of the system state may be maintained in memory and reflected in persisted form in the transaction log. In the event of a failure and restart the transaction log information may be re-read to build the corresponding in-memory structures. The time taken to perform such restarts may preferably be proportional to the time to re-populate those memory structures from the form contained in the log. However, support for high update transaction rates (with fairly simple updates) may be primarily constrained by the cost of disk IOs related to transaction commits. The present embodiment may then support the specification of a configuration parameter to allow an administrator to trade-off restart time for transaction throughput rates. This may be done by changing the amount of memory used before a disk based store is created.

Next, the store maintenance of the store maintenance and recovery component 351 as shown in FIG. 3 will now be described. In general, the store maintenance has three main operations to make the stores more compact and so guarantees that queries will not suffer from too much fragmentation. These three main operations designated as merge of IMSes, conversion of IMSes into SNSes and merge of SNSes are illustrated in FIG. 13.

The store maintenance is provided to achieve the following aspects:
(1) to minimize the resource utilization require to maintain the indices. Thereby a logarithmic cost in terms of sequential reads and writes of compact representations of the data is achieved. The mechanism exploits the high sequential read and write speeds of, for example, magnetic disk devices that can be contrasted with the relatively expensive random access costs of those devices. It is to be noted that this may require very large files and a substantial disk space overhead.
(2) to minimize the number of read only stores that reflect the state at any specific time and concentrate as much of the information as possible in as few stores as possible. As one key resource cost related to query processing for large data sets is the number of random disk accesses, and this will generally be related to the number of stores, minimizing this parameter is significant.
(3) to support the projection of potentially large numbers of attributes of individual entities by ensuring that a representation of such attributes occupies some contiguous range in some store. This ensures that such information can be accessed in at worst a single disk IO.

The store maintenance according an embodiment may achieve the above aspects using background merge processing activities that combine pairs of current committed stores to produce new merged stores. Although merge policies that allow the combination of more than two stores at a time can reduce the overall maintenance costs they can significantly increase the average number of stores active at any time and so increase the average query costs.

Figure 13:
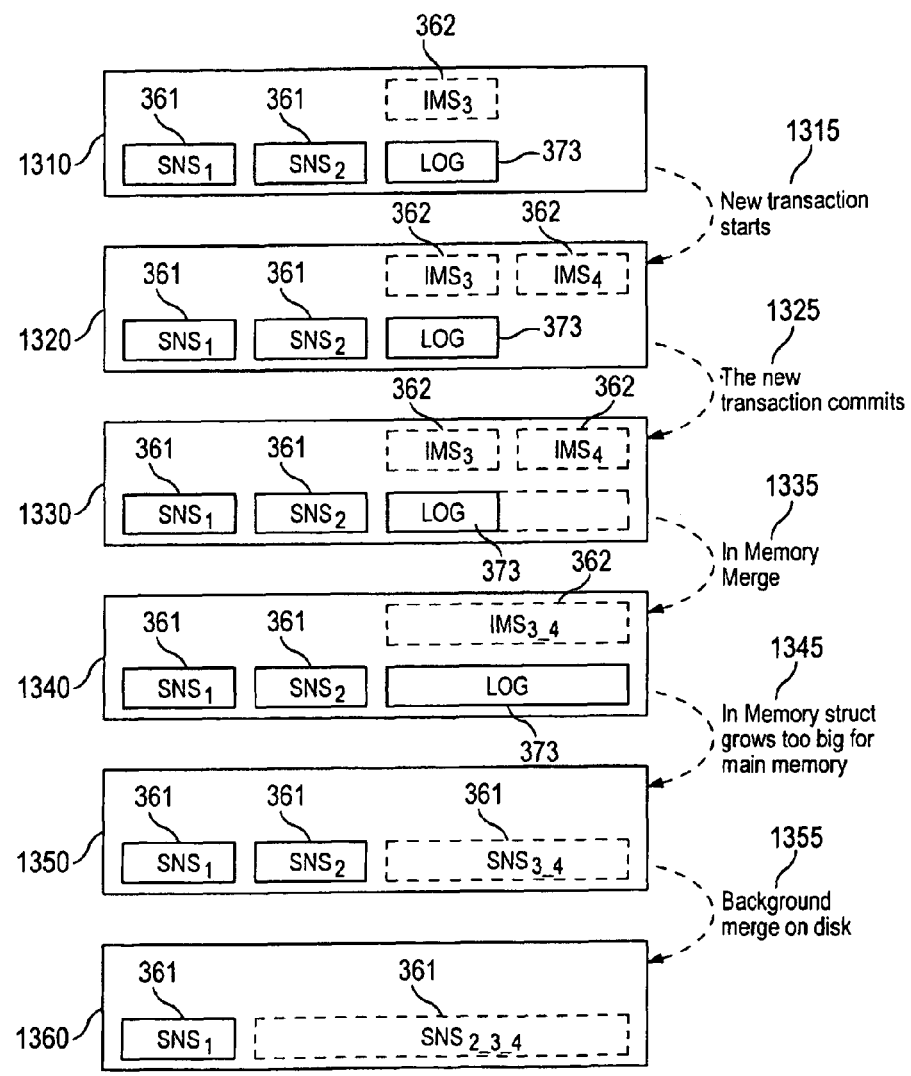
FIG. 13 shows an exemplary sequence of converting steps according to an embodiment of the present invention.

FIG. 13 shows the database in 5 different states 1310 to 1360. The database comprises, at the beginning in state 1310, for example two static node stores. $SNS_1$ 361 and $SNS_2$ 361, a transactional log file 373 and an in-memory node store $IMS_3$ 362 of a transaction committed before state 1310. Then a new transaction is started (shown by transition 1315). As shown in state 1320 and described above, a new in-memory node store $IMS_4$ 362 is created for the new transaction whereon all insert, update and delete operations of the transaction will be executed. When the new transaction is committed (shown by transition 1325), the database enters state 1330 wherein the in-memory node store $IMS_4$ 362 for the new transaction is committed and added to the global node store (not shown), and transaction information about the new transaction are stored in the transactional log file 373 as additional information. Then, the database begins to merge the in-memory node stores $IMS_3$ 362 and $IMS_4$ 362 (as shown by transition 1335) due to a predefined condition or a command. The aforementioned in-memory node stores $IMS_3$ 362 and $IMS_4$ 362 are merged to a new in-memory node store $IMS_{3,4}$ 362 (as shown in state 1340) which reduced the number of stores in the database and the costs for managing the same. A further operation of the store maintenance may be started when the in-memory node store $IMS_{3,4}$ 362 is grown so that it is too large for the main memory (illustrated by transition 1345). In this case, the in-memory node store $IMS_{3,4}$ 362 may be merged to a new static node store $SNS_{3\_4}$ 361 whereby the transactional log file 373 containing information about the transactions which have created the in-memory node stores can be deleted. Finally, if the number of static node stores grows over a predefined number, at least two static node stores $SNS_2$ 361 and $SNS_{3\_4}$ 361 may be merged by a background merging process, preferably, on disk (illustrated by transition 1355) so that the database comprises after this process two static node stores $SNS_1$ 361 and $SNS_{2\_3\_4}$ 361 only.

The store maintenance may further allow the configuration of different merge polices that can reduce the maintenance costs but will produce substantially higher average numbers of active stores.

As a default merge policy, the average number of active stores is to be minimized at the expense of some additional work for store maintenance.

This default merge policy may involve a form of binary merges. If it is assumed that consecutive committed stores are combined in a straightforward binary fashion the data involved in each commit will be involved in log_2 merges. In this case after N stores have been added and merged there will be between 1 and log_2 N stores. However, since the creating of disk based stores is avoided according to the described embodiments, and therefore disk based merges are required when the size of the committed store that have not been written to disk, other than in the transaction log, reaches some size that can be set by an user. Up to that point stores are only merged in memory to produce new in-memory read only stores. In general this process will also smooth out variations in the disk based merge activity due to corresponding variations in the amount of data committed in individual transactions. With this basic mechanism the number of disk based stores will be roughly log_2 of the total amount of committed data over the space of the smallest disk based store.

Using a pure binary merge policy at any point there will be one store of each power of two multiple of the smallest disk based store size. The alternative employed according to an embodiment reduces the average to something closer to log_4. The algorithm merges the new store at the next lower level into a single store at the next higher level 8 times, at which point that store becomes an input to the merges at the next higher level.

The following table illustrates a sequence of 8 store creations for the two policies. In the table the lists to the left of the semicolons indicate the number and sizes of the stores that exist at any point assuming that the merge activity from the previous row has completed before the next store of that size is generated.

TABLE 1

| N = 8 (as an example) | merge always | merge binary | merge 4-way |
|---|---|---|---|
| Average number of stores | 1 | 1.625 | 2.25 |
| Number of merges | 8 | 7 | 2 |

Number of stores and merges dependant on the number N of insertions of stores of size 1. These numbers hold when N is a multiple of a n-th power of 2 otherwise the numbers for average number of stores and number of merges vary slightly.

TABLE 2

| | merge always | merge binary | merge 4-way | Merge n-way |
|---|---|---|---|---|
| Average number of stores | 1 | $\frac{1}{2} \log_2 N$ | $\frac{3}{4} \log_2 N$ | $(n-1)/(2 \log_2 n) * \log_2 N$ |

TABLE 2-continued

|  | merge always | merge binary | merge 4-way | Merge n-way |
|---|---|---|---|---|
| Maximal number of stores | 1 | $\log_2 N$ | $1.5 \log_2 N$ | $(n-1)/\log_2 n * \log_2 N$ |
| Minimal number of stores | 1 | 1 | 1 | 1 |
| Number of merges | N | N/2 − 1 | ⅓ (N/2 − 1) | 1/n (N/2 − 1) |

The following table shows the trade-off between a binary merge and a n-way merge between fragmentation and merge cost. E.g., a 128-way merge has a 110 fold fragmentation compared to binary merge but only about 1/1000 of cost for ingestion.

TABLE 3

|  | merge binary | merge 4-way | merge 8-way | merge 16-way | merge 128-way | merge 1024-way |
|---|---|---|---|---|---|---|
| Fragmentation factor compared to binary merge | 1 | 1.5 | 2.3 | 3.75 | 18.14 | 110.3 |
| Factor in merge cost compared to binary merge | 1 | 0.5 | 0.25 | 0.125 | 0.0078 | 0.00098 |

The above described embodiment may provide means for the user to configure the merge parallelism. This enables to optimize the performance of the system for the anticipated behaviour with respect to ratios of entity creations and updates relative to query rates.

The parameters for the policy described above give the closest trade-off between merge costs and store counts assuming only binary merging is performed. Increasing the number of stores involved in the sequential merges (e.g. to 16 or 32) will decrease the average number of stores existing at any time at a roughly proportional increase in the merge costs. Decreasing the number of stores or allowing for greater than binary merges decreases the merge cost at an increase in the average number of stores to be accessed during query processing.

The update masking will now be described in more detail. As mentioned above, a critical component to allow the use of read only structures is the ability to mask matches for entities that are represented in multiple stores due to updates so that only matches against the current value of that entity are seen. Further, the cost of this masking must not outweigh the benefits of the use of the read only structures. Thus, according to an embodiment means are provided to achieve the above that rely on generic GapAccessors over the sets of entity IDs that exist in each store. The cost is also reduced by keeping the number of stores low with the mechanism of the store maintenance that guarantees exponential pattern of store sizes. The fact that store sizes grow exponential with age means that many operations only need the bigger and older stores and do not suffer from fragmentation.

The committed state of the system is a temporal sequence of committed stores, the larger and older ones are disk resident, while the newer and smaller ones are memory resident. The view seen by a transaction is made up of the set of committed stores that existed when the transaction was started, along with an updatable store that reflects new entities that are created during the transaction or updates to existing entities.

When any attribute of an entity is updated or a new attribute is added the non-updated attributes will at some point be copied into a new store that will then contain all of the current state for that entity (and corresponding index structure's). Each store maintains an ordered long set that consists of the set of entity IDs for entities that exist in that store. The set that is visible from any store is then the set of all those that exist in that store but do not exist in any more recent store. The following specifies the GapAccessor that is created to identify the set of entities for all stores that match some predicate P.

For example, it is assumed that the database comprises a sequence $S_1, \ldots, S_n$ of stores where $S_1$ denotes the oldest store and $S_n$ the newest. $GA_{ID}(S_j)$ is the GapAccessor over the ID set for store $S_j$ and is maintained within each store (with a structure $S_j$.IDs that contains the set of entity IDs whose entity representation exists in that store). For all entities that are modified (or deleted) in newer stores a mask operator is needed that allows to mask out the IDs that exist in newer stores efficiently. For this, a mask is used which is defined by the GapAccessor $GA_M(S_j)$ which is the union of all newer IDs, i.e., $GA_M(S_j)=\text{union}_{j=i+1,n} GA_{ID}(Sj)$.

The GapAccessor for the mask will now be used to restrict the result set that a predicate has some predicate P. Assume that the GapAccessor $GA(S_j,P)$ produces the ordered set of all IDs in store $S_j$ that satisfy predicate P. The set is polluted by entities that are modified (or deleted) in the meantime. To get the correct result we have to compute the difference between this set and the Mask for all entities modified in newer stores. i.e., $GA_M(S_j,P)=GA(S_j,P)-GA_M(S_j)=GA(S_j,P)-\text{union}_{j=i+1,n} GA_{ID}(Sj)$.

In the description above it may seem that it would have a quadratic (in the number of stores) number of masking accessors as the j-th store will need to be masked by all stores greater than j, the (j+1)-th by all greater than j+1 and so on. The above described embodiment avoids this explosion by reusing the same $GA_{ID}(S_j)$ for all requirements for masks for $S_j$. This loses some of the potential efficiencies from almost sequential accesses for the same accessor (although the expected costs are still at worst logarithmic), but avoids the need for a quadratic number of accessors.

The performance of this masking procedure is also related to the exponential growth, and the base for that growth, in the store size from the newest to the oldest stores. As the maximum size of a store at level i is 8 times that at the next lower level the vast bulk of the data will be in the oldest 1-3 stores. The ID sets of the smaller stores will then constitute a small fraction of the total number of IDs.

Figure 14:
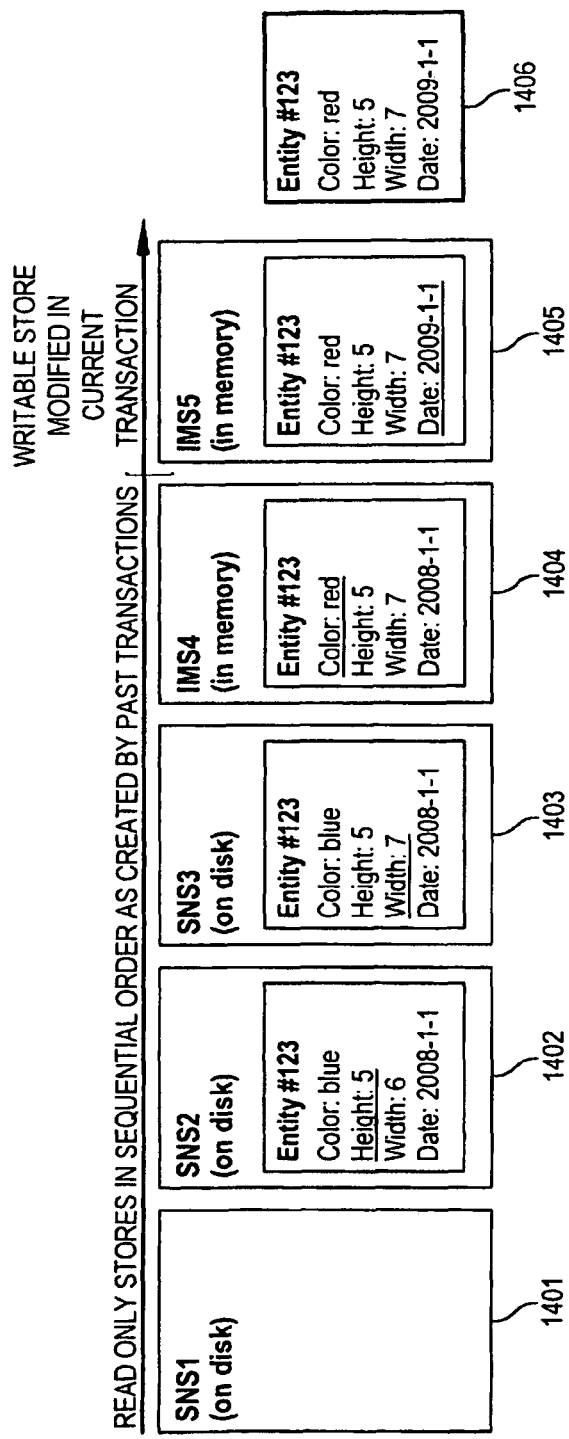
FIG. 14 illustrates an example of masking data entities in data stores according to an embodiment of the present invention.

An example of the above described update masking is shown in FIG. 14.

FIG. 14 illustrates a number of read only stores in sequential order which have been generated by previous transactions and merge operations, respectively, namely static node stores SNS1 1401, SNS2 1402 and SNS3 1403 all three are stored on a disk, and an in-memory node store IMS4 1404 held in main memory. Furthermore, an in-memory node store IMS5 1405 has been generated as the modifiable data store for a transaction currently performed in the database. As shown, stores SNS2 1402 to IMS5 1405 each comprises a data entity having identifier #123 which has been updated with respect to particular fields as will be described below. The data entity #123 has been newly created in static node store SNS2 1402 having the fields and field values as shown. This data entity #123 has been updated by a transaction started after the SNS2 1402 has been generated. Thus, the static node store SNS3 1403 comprises the data entity #123 having an updated field "Width=7". The data entity #123 has additionally been updated with respect to the field "Color" and stored in the in-memory node store IMS4 1404 by a transaction started after SNS3 1403 has been generated, but before the current transaction is started. The current transaction performs an update operation on the data entity #123 and changes the field "Date". When a query or projection operation is performed after the above update operation has been successfully performed the above described masking guarantees the view to the newest values of all entity fields. According to this view, data entity #123 1406 comprises the updated field "Color", "Width" and "Date" and the non updated fields "Height" as newest values.

In the following, embodiments of the database with respect to different configurations of the data stores, particularly the static node stores, will be described in more detail. The read only node stores (named static data stores, static node stores or SNS) are adapted to hold the bulk of the committed data.

A first embodiment of the static node store 361 will be described with reference to FIG. 15.

The static node store 361 comprises a store subset (also referred to as ordered ID subset) 1501 for storing each of the identifiers of the data entities stored in this static data store 361 and a unique subset identifier provided in the static data store 361 which is mapped to the identifier. A field map 1502 for storing a field name for each of the fields of the data entities stored in the static data store 361 and an offset associated with each field name is provided in the static field store 361. A field store 1503 for storing the single or multi valued value of each of the data entity fields of the data entities stored in the static data store 361 which are designated by the same field name in a field store 1503 provided in the static data store 361. The above offset defines the position of the field store 1503 in the static data store 361.

The above described configuration of the static node store may be generated during the conversion of one or more selected data stores of the ordered set of data stores by the following steps.

Each of the identifiers of the data entities stored in the new static data store and a unique subset identifier provided in the new static data store which is mapped to the identifier in a store subset provided in the new static data store is stored. A field name for each of the fields of the data entities stored in the new static data store and an offset associated with each field name in a field map provided in the new static data store is also stored wherein the offset is calculated based on the position of the field store in the new static data store. Then, the single or multi valued value of each of the fields of the data entities stored in the new static data store which are designated by the same field name in a field store provided in the new static data store is stored.

Figure 15:
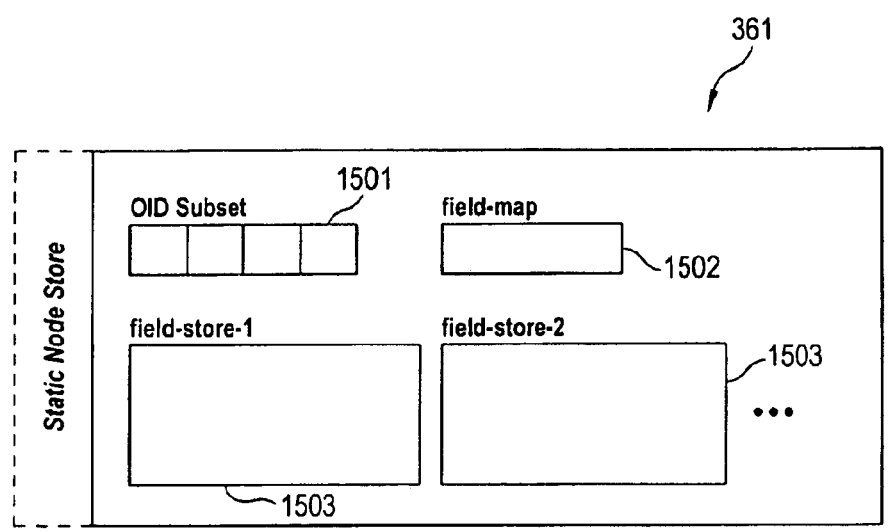
FIG. 15 illustrates a static data store according to an embodiment of the present invention.

The static node stores 361 may further comprise a row oriented projection store (not shown in FIG. 15). The row oriented projection store may use the configuration as known in the art, especially in the field of relational systems. In the row oriented projection store, each individual value may be encoded as byte sequences. The structure of the row oriented projection store may be a simple concatenation of field ids and value representations, where the latter just use a simple encoding of the multiple heterogeneous values. The space consumed for such representations, or random access to individual field values, can be trivially optimized using standard dictionary approaches exploiting the read only nature of these stores.

With respect to the above description, each static node store maintains the ordered set of internal object IDs (64 bit unsigned integers) which have data in that store. It is used to obtain the masks required to support the migration of update values to new stores. Internal to an SNS the indices and value store represent their information with respect to indices in the OID array for the SNS, rather than replicating the potentially much larger actual OID values throughout. This level of indirection may add to the complexity of query evaluation and store maintenance, but makes up for this with reductions in the space consumed by the index structures, which for full text indices in particular can have very large numbers of references to each object. The OID array is then used to map those back to the internal IDs for operations that span multiple SNSes. This mapping overhead is avoided for many operations by allowing evaluations to occur within the store internal ID space reflected by the OID array indices. For example, an entity filtering expression such as "(A or B) and (C or D)" can be completely evaluated within each SNS on the basis of these OID array indices before mapping the results to the global OIDs needed for merging with results from other stores.

The SNS OID arrays 1501 may according to one embodiment be implemented using the above described OUIS structure.

Figure 16:
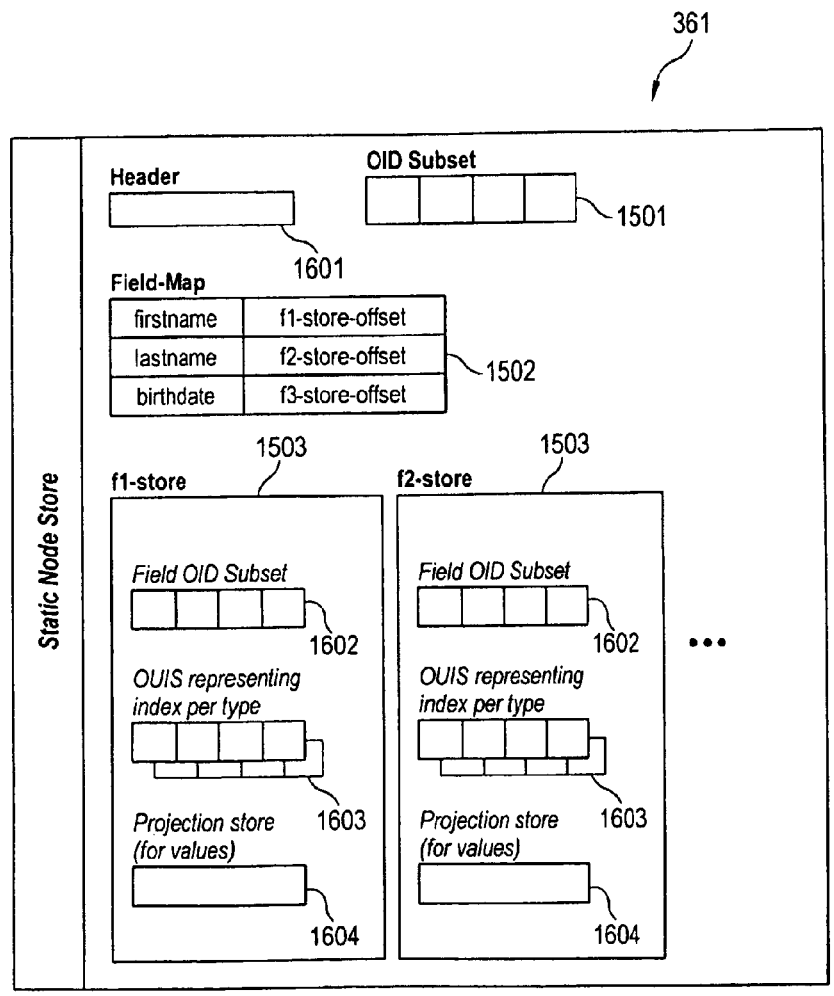
FIG. 16 illustrates a static data store according to another embodiment of the present invention.

A further configuration example of the static node store 361 is shown in FIG. 16. The static node store 361 of FIG. 16 differs from the configuration of the static node store of FIG. 15 in that it further comprises a header 1601 wherein information about the static node store 361 and the configuration thereof may be stored.

Furthermore, field store 1503 may contain a set of column oriented value stores 1604 also used as projection indices. Each field maintains the ordered set of the IDs of the objects in this store that have a value for the specified field in a field OID subset 1602. It is used as a mask for field operations. The field OID subsets 1602 may be implemented with the OUIS structure. The field stores 1503 may also contain an OUIS 1603 as an index per type.

Figure 17:
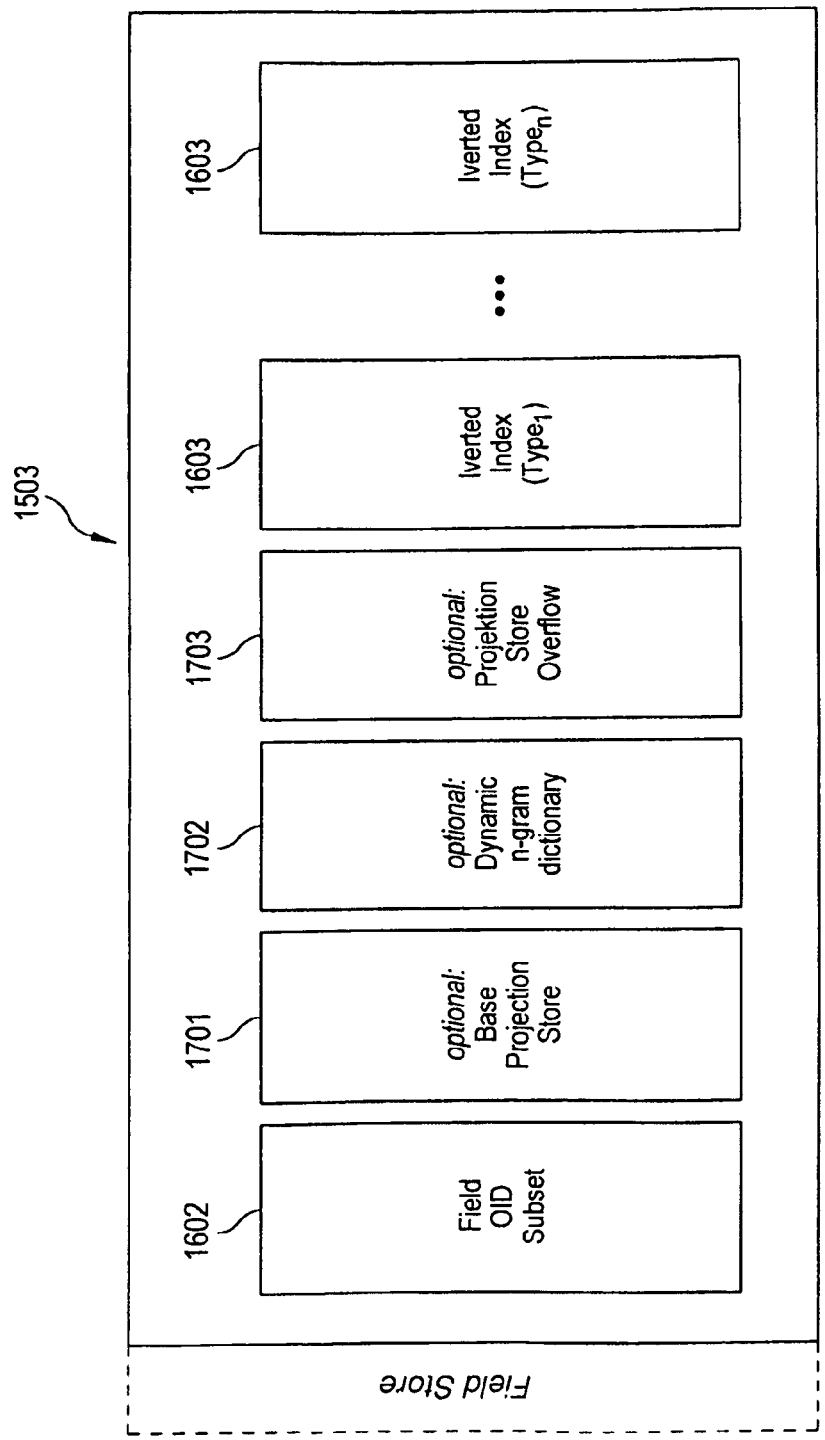
FIG. 17 shows a structure of a field store according to an embodiment of the present invention.

Another embodiment of the field store 1503 is shown in FIG. 17. According to this embodiment, the field store may comprise a base projection store, a dynamic n-gram dictionary, a projection store overflow, and a plurality of inverted indices per type 1603.

The base projection store 1701 may be a structure that holds the value entries for the field store. The base projection store 1701 is optional because the field lookup can also be done in the row based value store as described above. The use of this structure can speed up evaluations where many values of a field need to be looked up (e.g. for predicates that are not supported by indices) because the layout in the storage hierarchy is more compact than a structure where the values of complete rows are folded. The base projection store 1701 may better exploit storage, memory and cache hierarchies.

Following, the projection store overflow 1703 and the dynamic n-gram dictionary 1702 will be described in more detail.

The dynamic n-gram dictionary 1702 may be provided according to one embodiment, preferably in conjunction with the per field projection store (base projection store 1701) and the projection store overflow 1703 to support the following operations.

Standard projection requirements often involve only a small number of attributes associated with one entity. One of the most common operations in document management systems is browsing. The browsing operation requires at least the attributes: name, type, size, modification date and creator, while a typical entity has much more associated fields. For example, in a row based store where entities are randomly selected, full memory blocks of row based representations are fetched to obtain only the five attributes mentioned above from a single entity stored in that block. Such issues are one reason why typical RDB implementations spend much effort on page pining and related algorithms. Further, depending on the row value representation within the memory block the effort of extracting the desired values could be significant. The structures noted may also provide substantially better compression than a row based representation. It is the intention of the dynamic n-gram dictionary 1702 to have much higher likelihood of having the required info in Random Access Memory (RAM) so that access to individual value is faster and decoding is quicker.

In aggregation operations (also known as groupby-operation) generally a small number of fields is scanned to collect statistical information. As the entries in the projection store 1701 and its overflow 1703 are encoded relative to the global static dictionary (not shown in FIG. 17) provided in the database or each static node store for the type, and the dynamic n-gram dictionary 1702, using the indices into each whose ordering reflects the natural ordering for the type, it is possible to perform operations such as aggregating for a histogram without reference to the dictionaries, based solely on the dictionary references used in the projection store, once any literals associated with the request have been looked up.

In the rare case that a user specifies a predicate on some field that does not have an inverted index provided, the projection index provides the potential for a cheap scan and test operation on the value of the field provided in the predicate. This may be done by providing rapid random access from a store level OID to the encoded value(s) set for that OID for this field.

The implementation of the dynamic n-gram dictionary 1702 may use the same dictionary structure as the static dictionary, with the difference that what goes in may be the set of n-grams actually observed in this field, with their statistics used to improve the performance of the lookup as they will generally be in accordance with Zipfs law, just as the static dictionary entries are. According to an embodiment, the n-gram tokens may be encoded in some manner to limit the number of bits of each n-gram. In the case of "latin alphabet" natural language text, this means to simply encode each character in a 5 bit value and concatenate these. In this case n=5 or n=6 is chosen, along with a flag to indicate the position of the n-gram within the token, to limit the size of these values to <=32 bits. Then all keys used in the inverted indices or the projection index may be indices into either the global static dictionary for the type or the dynamic n-gram dictionary 1702. Where pairs of high frequency n-grams occur together, as with pairs of high frequency words, phrase level inverted indices may be used to speed the processing of predicates who's literal is a phrase or exceeds the size of a single n-gram.

According to an embodiment, the projection store overflow 1703 may be provided to deal with cases where the representation of the value that occurs for some OID for this field does not fit in the compact space allowed for each entry (i.e., the number of bits required to specify a dictionary reference). This may occur when the value is multi-valued or a multi-token (word or n-gram) full text value whose encoding takes more than one dictionary reference. In such cases the dictionary reference in the projection store 1701 may be replaced with an offset into a block of encoded values. The number of blocks may be determined at store creation time to ensure that the number of bits available in a projection store entry is adequate to reference any value in the block. The values may be stored in the same order in the projection store overflow 1703 as in the base projection store 1701 and the projection store overflow 1703 and may further provide an array of block base pointers whose size corresponds to the number of blocks.

The indices 1603 of the field stores 1503 will be described in more detail below.

The inverted index may comprise an index into the OID array to indicate that the OID at that location matches this predicate for this key, and a key provided as an unsigned integer produced as a dictionary index or as a chunking of some encoded value.

Multiplies the latter by the maximum index in the OID array (S) for a SNS to get the index entry. The entries associated with a key K will then have values in the range KS to (K+1)S. The set of all such values for a given index are stored in an OUIS. It is noted that the OUIS may automatically compress this structure as the space for keys that are repeated many times is factored out to the higher levels, and dense sequences of references are compressed in the low level chunks as well.

A variant referred to as a subset index may be used when predicates for a set of keys K' is to be supported such that a base index for a set of keys K of which the K' forms a partition of all occurrences can be provided. For example, if it is assumed that a date field and an index whose keys identify dates at a monthly granularity are provided, the set of all OIDs that match a particular month can be rapidly identified. If matches for a particular day are also to be quickly identified, an additional full index with references to the OID array, or a subset index may be used. The references for each day in each month are then indices into the range of the base index that corresponds to the month that includes that day. This range can often be much smaller than references to the entire OID array as the date field likely only occurs in a subset of all entities and the keys may identify many tens to hundreds of months. The references for the days in a particular month only need to be as large as the number of occurrences of that month. Further, the space for the monthly index will be significantly smaller than direct daily indices as on average each key will have about 30 times as many entries as the daily keys, so the OUIS compression will on average produce entries that are close to 5 bits smaller. However, processing the daily queries will involve the overhead of mapping through the monthly index each time. This cost may be offset to some degree by the potential reuse at a lower level in the memory hierarchy of the more compact monthly index. The subset index can have even more benefits for the more complex index variants needed to support various word containment predicates as described below. The key in all cases is to select base indices that most closely reflect the keys most commonly used in queries, and use subsets to enhance the performance of more rarely used, but still possible, key sets.

It is noted that the stores and corresponding indices may be continuously rewritten according to the above described embodiments. One way to exploit this is to monitor the predicates and key sets that are used in queries and select appropriate base and subset indices to optimize the performance of the anticipated query set and the maintenance of the index.

A base word containment index for the SNS may consist of word level addresses that are combined with a segment map structure that identifies the boundaries in these ranges between the various segments the system supports. As noted above these could be at the granularity of sentences, paragraphs, sections or full values. The addresses may be modified to sentence level, and possibly SVO identifiers. The default keys for the above embodiments may be the stem indices produced by the stemming dictionary, but also Wordnet synset like indices may be used.

The base index may further be combined with the segment maps to produce the segment level relevance ranking as well as the support for structured attributes needed for the attribute set requirement.

The remainder indices may be used to support word containment predicates that use modifiers to specify some variant of the word relative to the default provided by the base word index. For example, assume that a derivational morphology stem may be used as the base form for searches, but the query wants the surface form with the exception of the case and accent information. The remainder indices identify these variants as subsets of the postings associated with the base form. It is noted that these remainders are ordered and form a nested set of equivalence relations. Again with a default relation of derivational morphology stem the remaining relations are the inflectional morphology stem and the case and accent sensitivity. For example, in this case the surface form Indestructible would become destroy, +ible+in, none, Capitalized and the surface form destroying would be destroy, none, present participle, none.

According to one embodiment, the implementation may be analogous to the phrase index with multiple levels to handle the nested relations as described below.

A nested set of ordered tuple sets, encoded as U8s, may comprise the following fields key1, key2 and SS identifier in order.

The key1 may be a previous level key. At the top level this may correspond to a key in the base index. At each subsequent level this key may be the index of the structure identified to this point. For the above destroy example, the top-level key is the index of destroy in the dictionary that contains only base forms. The second level set key1 is the index in the top level of the entry for destroy and the derivational morphology variant identified by the key2 field in that entry.

The key2 may be an index into the dictionary of remainders that apply at this level. For example, at the top level this would be a dictionary of all of the derivational morphology variants that occur, or in the initial global dictionary for such variants.

The SS (subset) identifier may be an identifier of the subset indices described below which are partitioned by the sizes of the subset indices (i.e. the # of occurrences of the base key) to optimize the space required. This will be determined by the number of occurrences of the key1 word.

A set of subset indices that are ordered set of pairs, encoded as U8s, with the fields key pair index and subset index in order.

The key pair index may be the index of an element in the above pair set and the subset index may be the index in the order set of entries at the next higher level. For the top-level this will be the postings lists of the base form. For the other levels these will be the subsets identified by the enclosing key.

In a further embodiment, the person skilled in the art may provide means of a database system adapted to perform the method steps of the above described embodiments.

The above described embodiments may be implemented as components of a sample application such as a system that manages all emails, instant messages, blog posts and wiki posts in an organization, along with all the associated entities related to those entities such as the various types of email senders and recipients, including people, email lists, mail boxes, application based email enabled entities. The emails have attributes such as subject, body, and date and relationships to the other entities noted as senders and recipients as well as other entities such as attachments. The people may have multiple names that have potentially complex internal structures such as multiple middle names or hyphenated last names. Other applications (e.g. a records management system) may also attach other attributes to any of these entities to support their operations.

As described above, the method for performing transactions on a database and the transactional database according to the embodiments of the present invention have been described with reference to the exemplary drawings. However, the present invention is not limited to the embodiments and the drawings disclosed in this specification, and various changes and modifications can be made without departing from the scope of the present invention as defined by the accompanying claims.

The invention claimed is:

1. A method for performing transactions on data entities in a database, wherein each transaction comprises one or more operations, wherein said database comprises an ordered set of data stores with at least one static data store for storing data entities in non-transitory computer memory and performing queries on said data entities, wherein said static data store uses an index structure which is based on a non-updatable representation of an ordered set of integers according to a principle of compressed inverted indices, wherein each of said data entities comprises an unique identifier and a plurality of fields each containing a single or multi valued value, the method comprising for a transaction the steps of:

determining a current ordered set of data stores when said transaction is started;

storing information of said current ordered set of data stores as transactional state for said transaction;

when said transaction comprises an insert, update or delete operation, generating a modifiable data store and adding said modifiable data store as newest data store to said transactional state for said transaction, wherein said modifiable data store is configured to store data entities and to perform queries on said stored data entities;

executing said one or more operations of said transaction on the data entities in the data stores of which information has been stored in said transactional state; and when said transaction is committed and if said modifiable data store has been generated for said transaction, adding said modifiable data store as newest data store to said ordered set of data stores;

wherein, when one of said one or more operations of said transaction is a query operation with a query, said step of executing comprises:

performing said query against each of said data stores of which information has been stored in said transactional state, wherein said query returns ordered identifiers of data entities for each of said data stores that match with said query;

masking for each of said data stores those of said returned ordered identifiers for which a data entity with a same identifier already exists in a newer data store to produce masked identifiers;

uniting said masked identifiers to produce united identifiers; and returning said united identifiers;

wherein, when one of said one or more operations of said transaction is an insert operation for inserting a new data entity, said step of executing further comprises:

writing said new data entity in said modifiable data store with a new unique identifier for said new data entity;

wherein said method further comprises:
converting one or more selected data stores of said ordered set of data stores to a new static data store, wherein said converting step further comprises:
- reading all data entities from said one or more selected data stores;
- producing masked data entities by masking for each of said one or more selected data store said read data entities for which a data entity with same identifier already exists in a newer data store of said ordered set of data stores;
- merging said masked data entities to produce merged data entities;
- building a new index structure using identifiers of said merged data entities for said new static data store, wherein said new index structure is based on said non-updatable representation of an ordered set of integers according to a principle of compressed inverted indices;
- writing said merged data entities into said new static data store;
- adding said new static data store to said ordered set of data stores; and
- deleting said one or more selected data stores from said ordered set of data stores.

2. The method according to claim 1, wherein, when one of said one or more operations of said transaction is a projection operation for reading at least one field of an existing data entity associated with one of said ordered identifiers returned by said query operation, said step of executing further comprises:
- reading said single or multi valued value in said at least one field of said existing data entity; and
- returning said single or multi valued value.

3. The method according to claim 2, wherein, when one of said one or more operations is an update operation for updating at least one field of an existing data entity associated with one of said ordered identifiers returned by said query operation, said step of executing further comprises:
- executing said projection operation for reading at least those fields of said existing data entity not to be updated; and
- writing a new data entity corresponding to said existing data entity in said modifiable data store, which comprises the fields of said existing data entity not to be updated, said at least one updated field and said identifier of said existing data entity as identifier of said new data entity.

4. The method according to claim 2, wherein,
when one of said one or more operations is a delete operation for deleting at least one field of an existing data entity associated with one of said ordered identifiers returned by said query operation, said step of executing further comprises:
- executing a projection operation for reading at least those fields of said existing data entity not to be deleted; and
- writing a new data entity corresponding to said existing data entity in said modifiable data store, which comprises the fields of said existing data entity not to be deleted, and said identifier of said existing data entity as identifier of said new data entity; and
when one of said one or more operations is a delete operation for deleting an existing data entity associated with one of said ordered identifiers returned by said query operation, said step of executing further comprises:
- writing a new data entity corresponding to said existing data entity in said modifiable data store, which comprises a marker and said identifier of said existing data entity as identifier of said new data entity, wherein said marker indicates that said corresponding existing data entity is deleted.

5. The method according to claim 1, wherein said converting step further comprises:
- generating at least one mask containing at least those identifiers of the merged data entities which do not occur in data stores older than said one or more selected data stores.

6. The method according to claim 1, wherein at least one of said plurality of fields of said data entities comprises a natural language text value containing a plurality of words, wherein said database further comprises a dictionary including a mapping from words to wordindices, wherein said new index structure is built on a field of said data entities, wherein said field comprises said natural language text value, said step of building the new index structure further comprises:
- mapping a word of said natural language text value to a corresponding wordindex using said mapping of said dictionary; and
- mapping a pair comprising said wordindex and an identifier of a merged data entity to an integer of said ordered set of integers, if said new static data store contains said data entity and said field containing said word or a form of said word.

7. The method according to claim 1, wherein said new index structure further comprises blocks of consecutive integer entries of said ordered set of integers and a search tree, wherein each of said blocks contains a predefined number of chunks each having a predefined number of integer entries, wherein said step of building said new index structure further comprises:
- partitioning said ordered set of integers into blocks comprising a number of N×M integer entries, wherein N is said predefined number of chunks and M is said predefined number of integer entries;
- partitioning each of said blocks into chunks of said predefined number of integer entries;
- computing deltas of consecutive integer entries in each of said chunks;
- determining a maximum of said deltas and computing an entry size from said maximum, wherein said entry size is the size needed to write said maximum in an entry;
- consecutively writing said deltas in entries having said entry size;
- storing an offset of each of said chunks and its starting value in a header of the corresponding block; and
- building said search tree having a node for each of said blocks, wherein said node consists of a value of a first integer entry in said block and a pointer to a position where said block starts.

8. The method according to claim 1, wherein the step of converting further comprises:
- storing each of said identifiers of said data entities stored in said new static data store and an unique subset identifier provided in said new static data store which is mapped to said identifier in a store subset provided in said new static data store;
- storing a field name for each of said fields of said data entitles stored in said new static data store and an offset associated with each field name in a field map provided in said new static data store; and
- storing said single or multi valued value of each of said fields of said data entities stored in said new static data store which are designated by the same field name in a field store provided in said new static data store;

wherein said offset defines a position of said field store in said new static data store.

9. The method according to claim 1, wherein each of said data stores is configured to store relations between data entities, wherein a relation comprises an unique identifier and a plurality of fields each including one or more identifiers of said data entities which are included in said relation.

10. The method according to claim 1, wherein, when one of said one or more operations of said transaction is an insert, update or delete operation, said step of executing further comprises:
storing said insert, update or delete operation in a transactional log provided in said database, wherein said transaction log corresponds to said modifiable data store on which said insert, update or delete operation is executed.

11. A database system, comprising:
a non-transitory computer memory comprising an ordered set of data stores with at least one read-only static data store configured to store data entities and to perform queries on said data entities, wherein said static data store uses an index structure which is based on a non-updatable representation of an ordered set of integers according to a principle of compressed inverted indices, wherein each of said data entities comprises an unique identifier and a plurality of fields each including a single or multi valued value; and
a transaction controlling means for controlling transactions, wherein each transaction comprises one or more operations, wherein said transaction controlling means for controlling transactions is configured to perform for a transaction the steps of:
determining a current ordered set of data stores when said transaction is started;
storing information of said current ordered set of data stores as transactional state for said transaction;
when said transaction comprises an insert, update or delete operation, generating a modifiable data store and adding said modifiable data store as newest data store to said transactional state for said transaction, wherein said modifiable data store is configured to store data entities and to perform queries on said stored data entities;
executing said one or more operations of said transaction on the data entities in the data stores of which information has been stored in said transactional state; and
when said transaction is committed and if said modifiable data store has been generated for said transaction, adding said modifiable data store as newest data store to said ordered set of data stores;
wherein, when one of said one or more operations of said transaction is a query operation with a query, said means for controlling transaction is further configured to perform said step of executing by:
performing said query against each of said data stores of which information has been stored in said transactional state, wherein said query returns ordered identifiers of data entities for each of said data stores that match with said query;
masking for each of said data stores those of said returned ordered identifiers for which a data entity with a same identifier already exists in a newer data store to produce masked identifiers;
uniting said masked identifiers to produce united identifiers; and
returning said united identifiers;
wherein, when one of said one or more operations of said transaction is an insert operation for inserting a new data entity, said transaction controlling means for controlling transactions is further configured to perform said step of executing by:
writing said new data entity in said modifiable data store with a new unique identifier for said new data entity; and
wherein said database further comprises:
a converting means for converting one or more selected data stores of said ordered set of data stores to a new static data store, wherein said converting means is configured to perform the steps of:
reading all data entities from said one or more selected data stores;
producing masked data entities by masking for each of said one or more selected data store said read data entities for which a data entity with the same identifier already exists in a newer data store of said ordered set of data stores;
merging said masked data entities to produce merged data entities;
building a new index structure using the identifiers of said merged data entities for said new static data store, wherein said new index structure is based on said non-updatable representation of an ordered set of integers according to a principle of compressed inverted indices;
writing said merged data entities into said new static data store;
adding said new static data store to said ordered set of data stores; and
deleting said one or more selected data stores from said ordered set of data stores.

12. The database system according to claim 11, wherein, when one of said one or more operations of said transaction is a projection operation for reading at least one field of an existing data entity associated with one of said ordered identifiers returned by said query operation, said transaction controlling means for controlling transactions is further configured to perform said step of executing by:
reading said single or multi valued value in said at least one field of said existing data entity; and
returning said single or multi valued value.

13. The database system according to claim 12, wherein, when one of said one or more operations is an update operation for updating at least one field of an existing data entity associated with one of said ordered identifiers returned by said query operation, said transaction controlling means for controlling transactions is further configured to perform said step of executing by:
executing said projection operation for reading at least those fields of said existing data entity not to be updated; and
writing a new data entity corresponding to said existing data entity in said modifiable data store, which comprises the fields of said existing data entity not to be updated, said at least one updated field and said identifier of said existing data entity as identifier of said new data entity.

14. The database system according to claim 12, wherein, when one of said one or more operations is a delete operation for deleting at least one field of an existing data entity associated with one of said ordered identifiers returned by said query operation, said transaction controlling means for controlling transactions is further configured to perform said step of executing by:
executing a projection operation for reading at least those fields of said existing data entity not to be deleted; and writing a new data entity corresponding to said existing data entity in said modifiable data store, which comprises the fields of said existing data entity not to be deleted, and said identifier of said existing data entity as identifier of said new data entity; and when one of said one or more operations is a delete operation for deleting an existing data entity associated with one of said ordered identifiers returned by said query operation, said transaction controlling means for controlling transactions is further configured to perform said step of executing by:

writing a new data entity corresponding to said existing data entity in said modifiable data store, which comprises a marker and said identifier of said existing data entity as identifier of said new data entity, wherein said marker indicates that said corresponding existing data entity is deleted.

15. The database system according to claim 11, wherein said converting means is further configured to perform the step of:

generating at least one mask containing at least those identifiers of the merged data entities which do not occur in data stores older than said one or more selected data stores.

16. The database system according to claim 11, wherein at least one of said plurality of fields of said data entities comprises a natural language text value containing a plurality of words, wherein said database further comprises a dictionary including a mapping from words to wordindices, wherein said new index structure is built on a field of said data entities, wherein said field comprises said natural language text value, wherein said means for converting is further configured to perform the steps of:

mapping a word of said natural language text value to a corresponding wordindex using said mapping of said dictionary; and mapping a pair comprising said wordindex and an identifier of a merged data entity to an integer of said ordered set of integers, if said new static data store contains said data entity and said field containing said word or a form of said word.

17. The database system according to claim 11, wherein said new index structure further comprises blocks of consecutive integer entries of said ordered set of integers and a search tree, wherein each of said blocks contains a predefined number of chunks each having a predefined number of integer entries, wherein said means for converting is further configured to perform said step of building the new index structure by:

partitioning said ordered set of integers into blocks comprising a number of N×M integer entries, wherein N is said predefined number of chunks and M is said predefined number of integer entries;

partitioning each of said blocks into chunks of said predefined number of integer entries;

computing deltas of consecutive integer entries in each of said chunks;

determining a maximum of said deltas and computing an entry size from said maximum, wherein said entry-size is the size needed to write said maximum as an entry;

consecutively writing said deltas in entries having said entry-size;

storing an offset of each of said chunks and its starting value in a header of the corresponding block; and building said search tree having a node for each of said blocks, wherein said node consists of a value of a first integer entry in said block and a pointer to a position where said block starts.

18. The database system according to claim 11, wherein the static data store further comprises:

a store subset for storing each of said identifiers of said data entities stored in said static data store and a unique subset identifier provided in said static data store which is mapped to said identifier;

a field map for storing a field name for each of said fields of said data entities stored in said static data store and an offset associated with each field name; and a field store for storing said single or multi valued value of each of said data entity fields of said data entities stored in said static data store which are designated by the same field name in a field store provided in said static data store;

wherein said offset defines Th-e-a position of said field store in said static data store.

19. The database system according to claim 11, wherein each of said data stores is configured to store relations between data entities, wherein a relation comprises an unique identifier and a plurality of fields each including one or more identifiers of said data entities which are included in said relation.

20. The database system according to claim 11, wherein, when one of said one or more operations of said transaction is an insert, update or delete operation, said database further comprises a transactional log corresponding to said modifiable data store on which said insert, update or delete operation is executed, wherein said means for controlling transaction is further configured to perform the step of storing said insert, update or delete operation in said transactional log.

\* \* \* \* \*